(12) United States Patent
Asai

(10) Patent No.: US 8,970,868 B2
(45) Date of Patent: Mar. 3, 2015

(54) PRINT SYSTEM, PROGRAM, AND PRINTER

(75) Inventor: Daisuke Asai, Seto (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 811 days.

(21) Appl. No.: 12/411,516

(22) Filed: Mar. 26, 2009

(65) Prior Publication Data
US 2009/0296116 A1    Dec. 3, 2009

(30) Foreign Application Priority Data

May 29, 2008   (JP) ................................. 2008-140532

(51) Int. Cl.
*G06K 15/00*       (2006.01)
*H04N 1/407*       (2006.01)
*H04N 1/00*        (2006.01)

(52) U.S. Cl.
CPC ......... *H04N 1/4078* (2013.01); *H04N 1/00002* (2013.01); *H04N 1/00015* (2013.01); *H04N 1/00031* (2013.01); *H04N 1/00045* (2013.01); *H04N 1/0005* (2013.01); *H04N 1/00055* (2013.01); *H04N 1/00063* (2013.01); *H04N 1/00087* (2013.01); *H04N 1/0009* (2013.01); *H04N 1/00204* (2013.01); *H04N 1/00278* (2013.01); *H04N 1/00347* (2013.01)
USPC ....................................................... 358/1.15

(58) Field of Classification Search
USPC .................... 358/1.9, 1.13–1.16, 504; 400/62
See application file for complete search history.

(56) References Cited

U.S. PATENT DOCUMENTS

| | | | |
|---|---|---|---|
| 5,950,036 A | 9/1999 | Konishi | |
| 6,033,137 A * | 3/2000 | Ito | ................................... 400/74 |
| 6,614,546 B1 * | 9/2003 | Kurozasa | ..................... 358/1.15 |
| 6,825,944 B1 | 11/2004 | Noda | |

(Continued)

FOREIGN PATENT DOCUMENTS

| | | |
|---|---|---|
| JP | 7-288704 A | 10/1995 |
| JP | 10-114128 A | 5/1998 |

(Continued)

OTHER PUBLICATIONS

JP Office Action dtd Mar. 8, 2011, JP Appln. 2008-140532, English translation.
JP Office Action dtd May 11, 2010, JP Appln. 2008-140532, partial English translation.

*Primary Examiner* — Tammy Pham
*Assistant Examiner* — Bharatkumar Shah
(74) *Attorney, Agent, or Firm* — Banner & Witcoff, Ltd.

(57) ABSTRACT

A print system, computer readable media, and printer are provided. The print system includes a printer and a computer. The printer includes a print unit that generates an image on a sheet from output data; a generation unit that generates correction data for correcting print data; and a transmission unit that transmits the correction data to the computer. The computer includes a correction unit that corrects the print data using the correction data transmitted from the transmission unit, thereby generating the output data; and an output unit that outputs the output data to the printer. The printer system also includes a wait state maintain unit that is configured to maintain a wait state so as not to start a printing of the output data corrected in accordance with the correction data generated during a period from a time at which generation of the correction data is commenced by the generation unit until a time at which the transmission unit transmits the correction data.

19 Claims, 17 Drawing Sheets

(56) References Cited

U.S. PATENT DOCUMENTS

| | | | |
|---|---|---|---|
| 7,160,040 B2 * | 1/2007 | Matsushima | 400/62 |
| 7,471,409 B2 | 12/2008 | Kurakata | |
| 7,616,230 B2 * | 11/2009 | Fukui | 348/207.2 |
| 2004/0032615 A1 | 2/2004 | Kurakata | |
| 2007/0019258 A1 | 1/2007 | Hattori | |
| 2007/0285743 A1 * | 12/2007 | Hirayama | 358/504 |
| 2008/0285079 A1 | 11/2008 | Kurakata | |

FOREIGN PATENT DOCUMENTS

| | | |
|---|---|---|
| JP | 10-117264 | 5/1998 |
| JP | 2000-155653 | 6/2000 |
| JP | 2004-074561 A | 3/2004 |
| JP | 2006-062279 A | 3/2006 |
| JP | 2007-098613 | 4/2007 |
| JP | 2007-124435 | 5/2007 |

* cited by examiner

*FIG. 6*

| FOR BLACK | 0,1,1,2,2,3,4,4,5,6,6,7,8,8,9,10,10,···253,255 |
|---|---|
| FOR CYAN | 0,1,2,2,3,4,4,5,6,6,7,8,8,9,10,11,11,···253,255 |
| FOR MAGENTA | 0,1,1,2,2,3,4,4,5,6,6,7,8,8,9,9,10,···253,255 |
| FOR YELLOW | 0,1,1,2,3,4,4,5,6,6,7,8,8,9,10,11,11,···253,255 |

↓ WHEN CALIBRATION IS BEING PERFORMED

↓ WHEN CALIBRATION IS COMPLETED

PRINT SYSTEM, PROGRAM, AND PRINTER

CROSS REFERENCE TO RELATED APPLICATION

The present application claims priority from Japanese Patent Application No. 2008-140532, which was filed on May 29, 2008, the disclosure of which is herein incorporated by reference in its entirety.

TECHNICAL FIELD

Systems, computer readable media, and apparatuses consistent with the present disclosure relate to color correction using color correction data.

BACKGROUND

JP-A-2007-124435 describes a related art color correction technique which is performed by an image forming system in which a host computer performs color correction processing by use of color correction data generated by an image forming apparatus. The related art technique determines whether or not output data has undergone appropriate color correction processing when the image forming apparatus receives a print command from the host computer by comparing color correction data acquired when the output data underwent color correction processing with color correction data in the image forming apparatus.

SUMMARY

The related art technique described above has a disadvantage in that it is uncertain as to what correction data are used for performing printing when a computer has sent output data to a printer in the course of the printer making correction data.

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Illustrative aspects of the present invention prove a print system, a driver, and a printer, which can appropriately process output data during a period from when a printer starts generation of correction data until the correction data is transmitted.

According to an illustrative aspect of the present invention, there is provided a print system comprising a printer and a computer. The printer includes a print unit that generates an image on a sheet from output data, a generation unit that generates correction data for use in correcting print data, and a transmission unit that transmits the correction data to the computer. The computer includes a correction unit that corrects the print data in accordance with the correction data transmitted from the transmission unit, thereby generating the output data; and an output unit that outputs the output data to the printer. The print system also includes a wait state maintain unit that is configured to maintain a wait state so as not to start a printing of the output data corrected in accordance with the correction data generated during a period from a time at which generation of the correction data is commenced by the generation unit until a time at which the transmission unit transmits the correction data.

BRIEF DESCRIPTION OF THE DRAWINGS

Illustrative aspects of the invention will be described in detail with reference to the following figures wherein:

FIG. 6 is an explanatory view for conceptually describing an example of a γ table generated from γ table data;

FIG. 10-1 to 10-3 are examples of display screens appearing on the computer of FIG. 1, wherein FIG. 10-1 is a display view for selecting a print command, FIG. 10-2 is a display view showing that the printer is in the middle of calibration, and FIG. 10-3 is a display view for selecting commencement of print processing;

DETAILED DESCRIPTION OF EXEMPLARY EMBODIMENTS OF THE PRESENT INVENTION

Exemplary embodiments of the present invention will be described along with the drawings.

<Overall Configuration>

Figure 1:
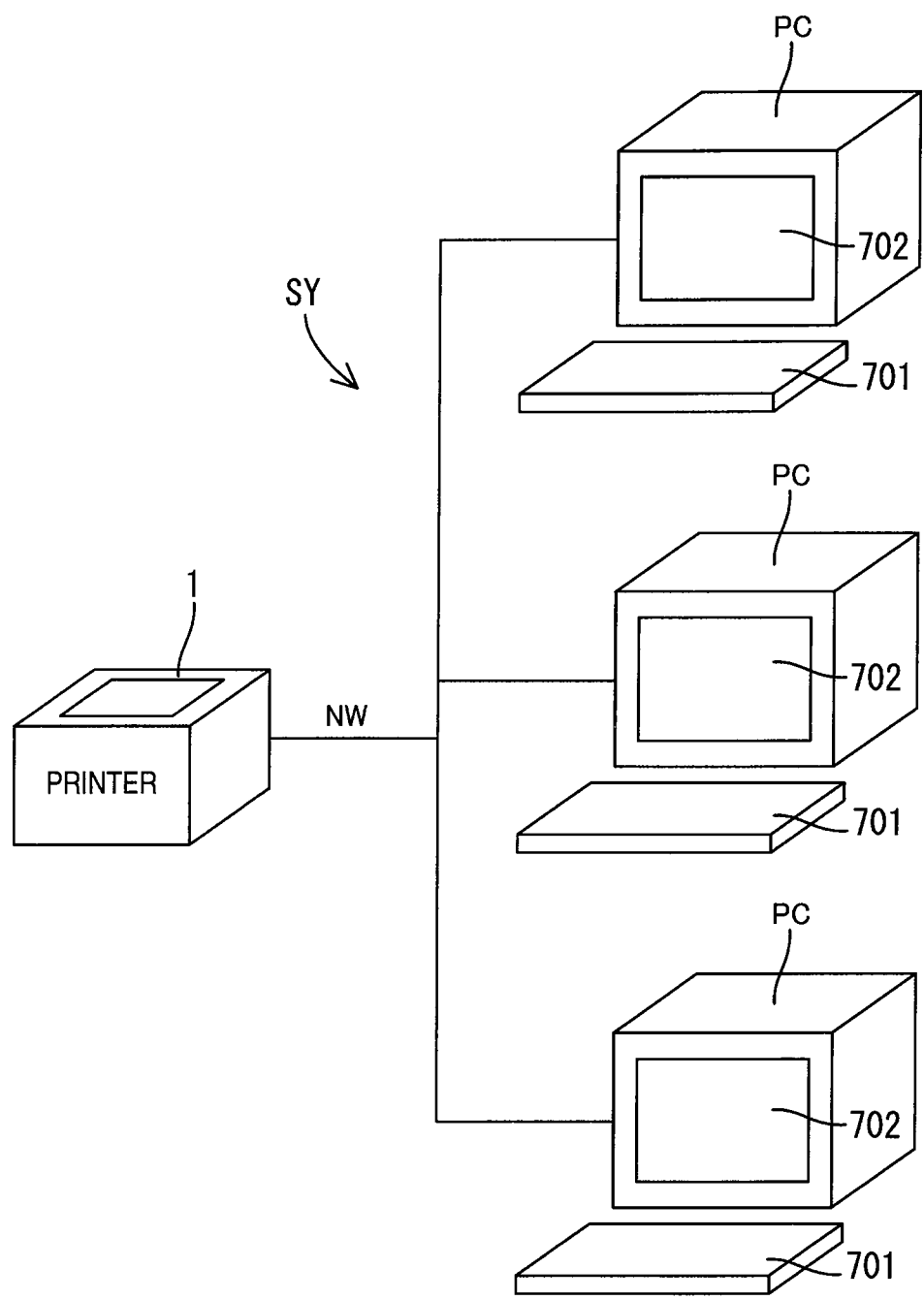
FIG. 1 is an external view of an example of a print system including a printer and a computer according to an exemplary embodiment of the present invention.

FIG. 1 is an external view showing an overview of a print system including a printer and a computer according to an exemplary embodiment of the present invention.

As shown in FIG. 1, a print system SY includes a color printer (hereinafter called a "printer") 1 that can perform electrophotographic printing and a plurality of personal computers (hereinafter called "PCs") that are coupled to the printer 1 by way of a network NW, such as a LAN and/or the Internet. Each of the PCs has an operation section 701 and a display section 702.

<Device Configuration of the Printer>

The configuration of the printer 1 is first described.

Figure 2:
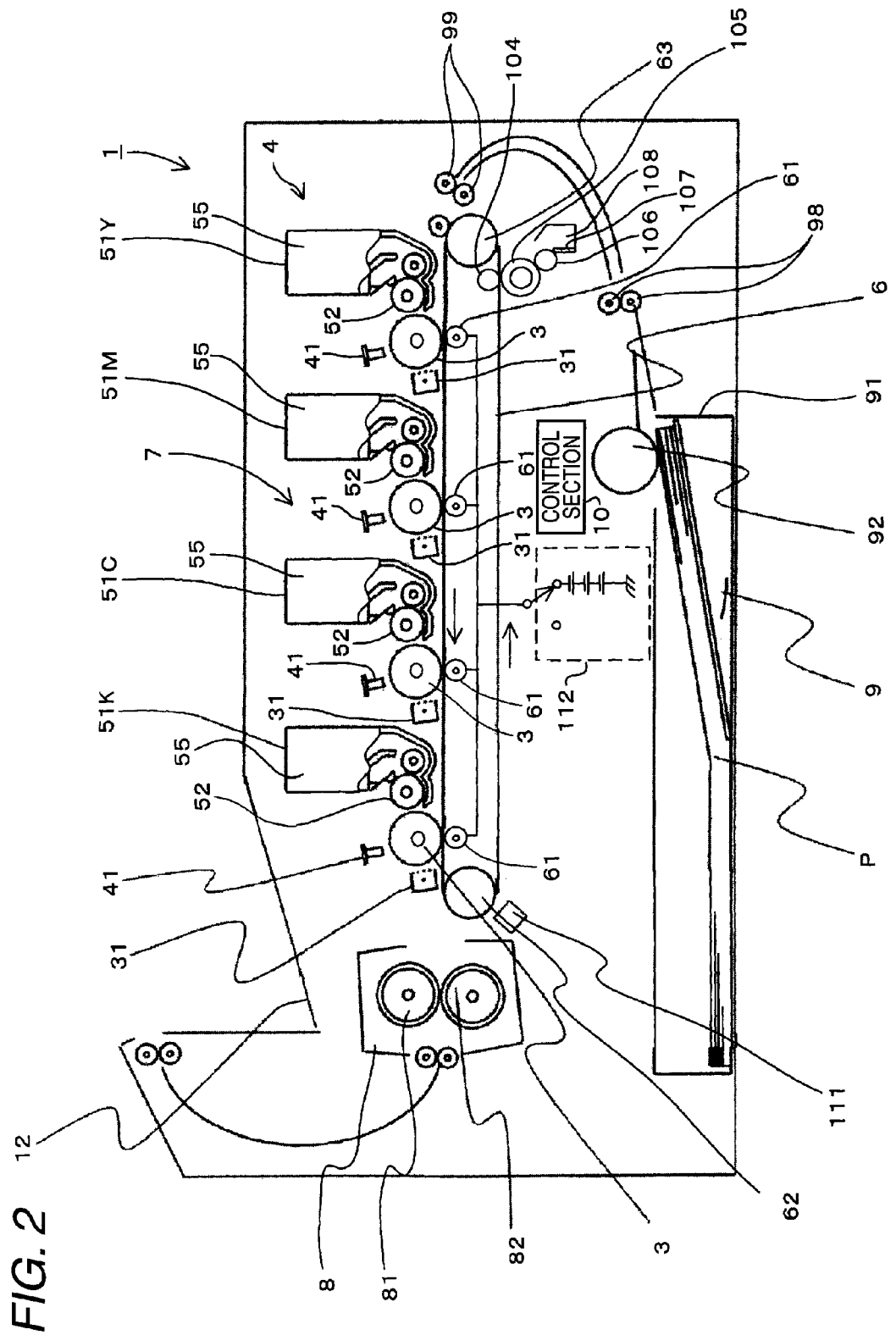
FIG. 2 is a schematic cross-sectional view showing an example of an internal configuration of a printer of FIG. 1.

FIG. 2 is a schematic cross-sectional view showing an example of an internal configuration of the printer 1. The printer 1 illustrated in FIG. 2 includes a record engine 7 that includes a toner image generation section 4 and a sheet conveyance belt 6 and that serves as print unit of the present invention; a fixing section 8; a sheet feed section 9; a stacker 12; and a control section 10. The printer 1 produces, on a sheet P serving as a recording medium, images of four colors according with output data, which is input from the outside the printer 1.

The toner image generation section 4 includes four development units 51Y, 51M, 51C, and 51K; photosensitive drums 3; electrifiers 31; and exposure units 41.

The photosensitive drums 3 are disposed in correspondence with respective four toner image generation processes employing yellow toner stored in the development unit 51Y, magenta toner stored in the development unit 51M, cyan toner stored in the development unit 51C, and black toner stored in the development unit 51K. The electrifiers 31 are provided in correspondence with the respective photosensitive drums 3 in order to uniformly electrify corresponding photosensitive drums 3. Moreover, the exposure units 41 are provided for the respective photosensitive drums 3 in order to produce electrostatic latent images according with output data by exposing surfaces of the respective electrified photosensitive drums 3 to a laser beam.

The configuration of each of the above elements will be described in more detail hereunder. In the following description, when the configurations are distinguished from each other according to a color, subscripts Y (yellow), M (magenta), C (cyan), and K (black) are affixed to symbols of the respective elements. In contrast, when a distinction between the configurations is not used, the subscripts are omitted.

The photosensitive drums 3 of the toner image generation section 4 are built from essentially-cylindrical members, and the four photosensitive drums are arranged at essentially-equal intervals in a horizontal direction in a rotatable fashion.

The electrifiers 31 are so-called scorotoron-type electrifiers and positively electrify surfaces of the respective photosensitive drums 3.

Each of the exposure units 41 emits from a light source a laser beam corresponding to one color of output data entered from the outside, thereby irradiating the surface of the corresponding photosensitive drum 3. When the exposure unit 41 irradiates the surface of the photosensitive drum 3 with the laser beam corresponding to the output data, a surface potential of an exposed area decreases, whereupon an electrostatic latent image is produced on the surface of the photosensitive drum 3.

Moreover, the respective development units 51Y, 51M, 51C, and 51K are configured with development rollers 52 housed in development unit cases 55 that store colors (yellow, magenta, cyan, and black) of toner.

Each of the development units 51 positively electrifies toner (with positive polarity) and supplies a corresponding photosensitive drum 3 with the toner in the form of a uniform thin film. The positively-electrified toner (with positive polarity) is laid over the positive electrostatic latent image (with positive polarity) produced on the photosensitive drum 3 at a contact position between the development roller 52 and the photosensitive drum 3 by means of reversal development, thereby developing the electrostatic latent image.

The sheet feed section 9 is disposed at the lowest position in the printer and includes a sheet storage tray 91 for storing sheets P and a pickup roller 92 that feeds the sheets P. The pickup roller 92 picks up the sheet P stored in the sheet storage tray 91 one at a time from the sheet feed section 9 and sends the thus-picked sheet to the sheet conveyance belt 6 by way of a conveyance roller 98 and registration rollers 99.

The sheet conveyance belt 6 is endlessly arranged so as to travel along with the sheet P while the sheet P is held on an upper surface of the sheet conveyance belt and stretched between a drive roller 62 and a driven roller 63. Transfer rollers 61 are disposed in the vicinities of positions opposite the respective photosensitive drums 3 with the sheet conveyance belt 6 sandwiched there between. A surface of the sheet conveyance belt 6 opposing the photosensitive drum 3 travels from right to left in the drawing as indicated by an arrow in FIG. 2 by means of rotation of the drive roller 62, thereby sequentially conveying the sheet P sent from the registration rollers 99 to a position between the photosensitive drum 3 and the conveyance belt and feed the sheet to the fixing section 8.

A density detection sensor 111 is disposed at a position on the drive roller 62 opposing the sheet conveyance belt 6. The density detection sensor 111 is made up of a light source that emits light in an infrared range, a lens that radiates the light from the light source on the sheet conveyance belt 6, and a phototransistor that receives light reflected from the lens; and measures the density of a toner image on the sheet conveyance belt 6.

A cleaning roller 105 is placed at a position, which is close to the driven roller 63, on the surface of the sheet conveyance belt 6 wrapped around the drive roller 62. The cleaning roller 105 is arranged so as to be imparted with a bias from a metal electrode roller 104 placed at an opposite position with the sheet conveyance belt 6 sandwiched therebetween, thereby rotating while remaining in contact with the sheet conveyance belt 6. The toner adhering to the sheet conveyance belt 6 is removed by the cleaning roller 105 by means of the bias.

A metal recovery roller 106 for removing the toner from the cleaning roller 105 and a storage box 108 for storing the toner removed from the cleaning roller 105 are also provided. A rubber cleaning blade 107 remains in contact with the recovery roller 106 and works so as to scrape the toner adhering to the recovery roller 106.

The transfer roller 61 can apply, to a point between the transfer roller 61 and the photosensitive drum 3, a transfer bias whose polarity is opposite to charging polarity of the toner by means of a negative voltage current source 112; and can transfer a toner image produced on the photosensitive drum 3 to the sheet P conveyed by the sheet conveyance belt 6.

The fixing section 8 includes a heating roller 81 and a pressure roller 82; and subjects the sheet P with the transferred toner image to heating and pressurization while conveying the sheet in a state of being pinched between the heating roller 81 and the pressure roller 82, thereby fixing the toner image on the sheet P.

Further, a stacker 12 is formed in an upper surface of the printer 1. The stacker 12 is located on a document-exit side of the fixing section 8 and keeps the sheets P exiting from the fixing section 8.

The control section 10 includes a controller using a central processing unit (CPU) 10A (see FIG. 4), as will be described later, and controls the operation of the printer 1.

Print processing that the sheet P undergoes in the printer 1 having the aforementioned configuration is as follows.

First, a single sheet P is fed from the sheet feed section 9 by the pickup roller 92 and delivered to the sheet conveyance belt 6 by way of the conveyance rollers 98 and the registration rollers 99.

Next, the surface of the rightmost photosensitive drum 3 of FIG. 2 is uniformly electrified by the electrifier 31 and exposed by the corresponding exposure unit 41 in correspondence with yellow output data entered from the outside, whereupon an electrostatic latent image is produced as mentioned above. Yellow toner positively charged by the development unit 51Y is supplied to the surface of the photosensitive drum 3Y, where development is performed. The thus-produced toner image is transferred onto the surface of the sheet P conveyed by the sheet conveyance belt 6, by the transfer roller 61 applied with the transfer bias.

The sheet P is then sequentially conveyed to positions opposite the respective magenta, cyan, and black photosensitive drums 3, and toner images are produced on the surface of the photosensitive drum 3 through the same procedures as those for the yellow toner and transferred to the sheet P in an overlaid manner by the transfer roller 61. Finally, the toner images of four colors produced on the sheet P are fixed onto the sheet P by the fixing section 8, and the sheet P exits on the stacker 12.

Further, when the printer 1 is commanded to perform calibration as will be described below, the toner image generation section 4 of the record engine 7 produces a measurement patch 992 as illustrated in; for instance, FIG. 3, on the sheet conveyance belt 6 from patch data 991 (see FIG. 5). At the time of production of the measurement patch 992, a density detection sensor 111 of the record engine 7 measures densities of respective colors making up the measurement patch 992.

<Control Configuration of the Printer>

Figure 4:
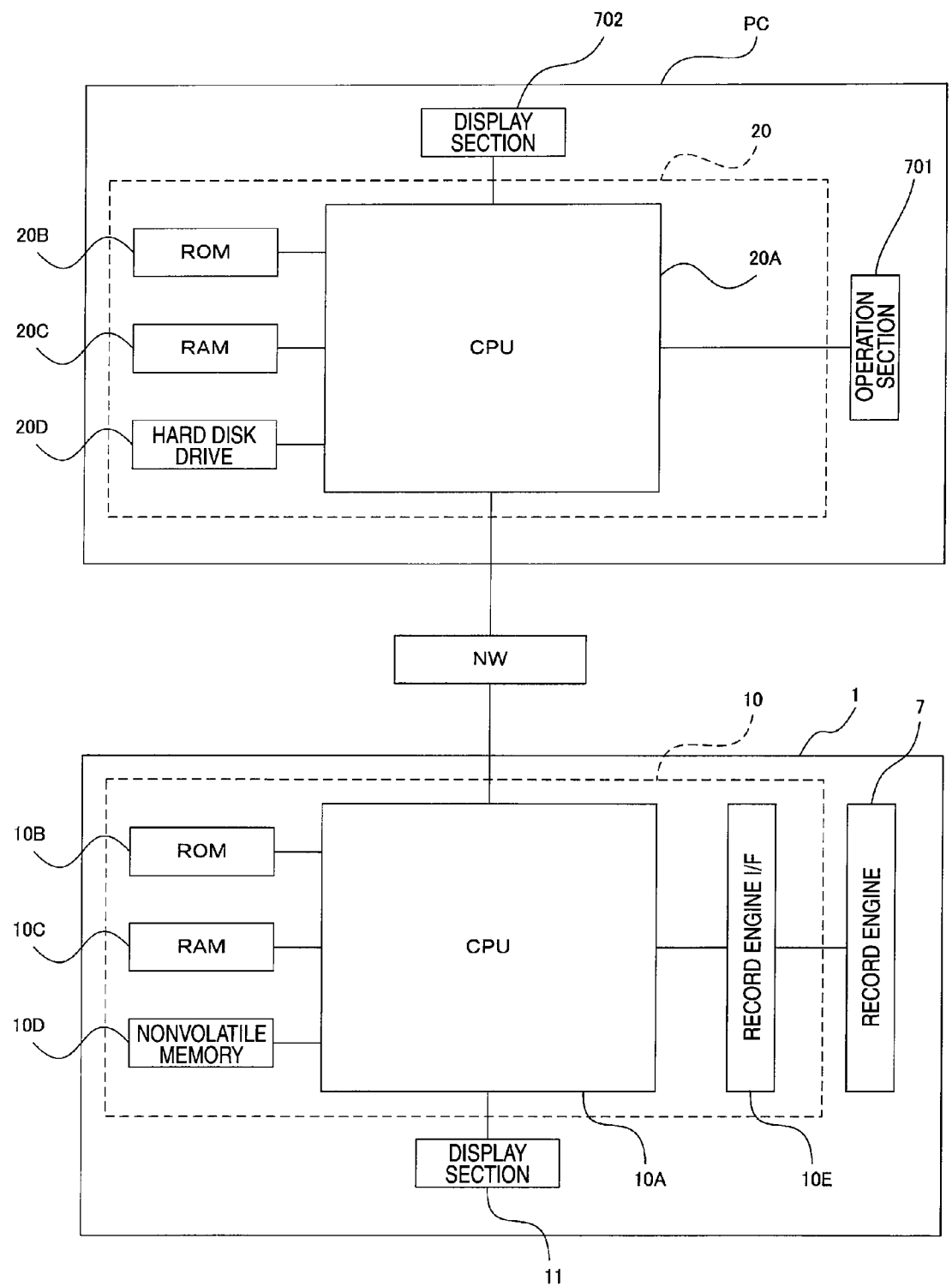
FIG. 4 is a block diagram showing an example of a hardware configuration of the print system of FIG. 1.

FIG. 4 is a block diagram showing an example of a hardware configuration of the printer 1. As shown in FIG. 4, the control section 10 of the printer 1 is made up of a CPU 10A, a read only memory (ROM) 10B, a random access memory (RAM) 10C, a nonvolatile memory 10D, and a record engine I/F 10E. The CPU 10A is coupled to the record engine 7 by way of the record engine I/F 10E; transmits drive signals to respective sections; and receives detection signals from various sensors.

Moreover, the CPU 10A is coupled to the PC by way of the network NW. The display section 11 is also made up of means capable of displaying an image, such as an LCD panel, and is coupled to the CPU 10A.

The control section 20 of the PC has a configuration in which a keyboard, a mouse, and others, serving as an operation section 701 and a display, and the like, serving as a display section 702 are coupled to a main body having a CPU 20A, ROM 20B, RAM 20C, and a hard disk drive 20D.

<Control Configuration in the Print System>

Figure 5:
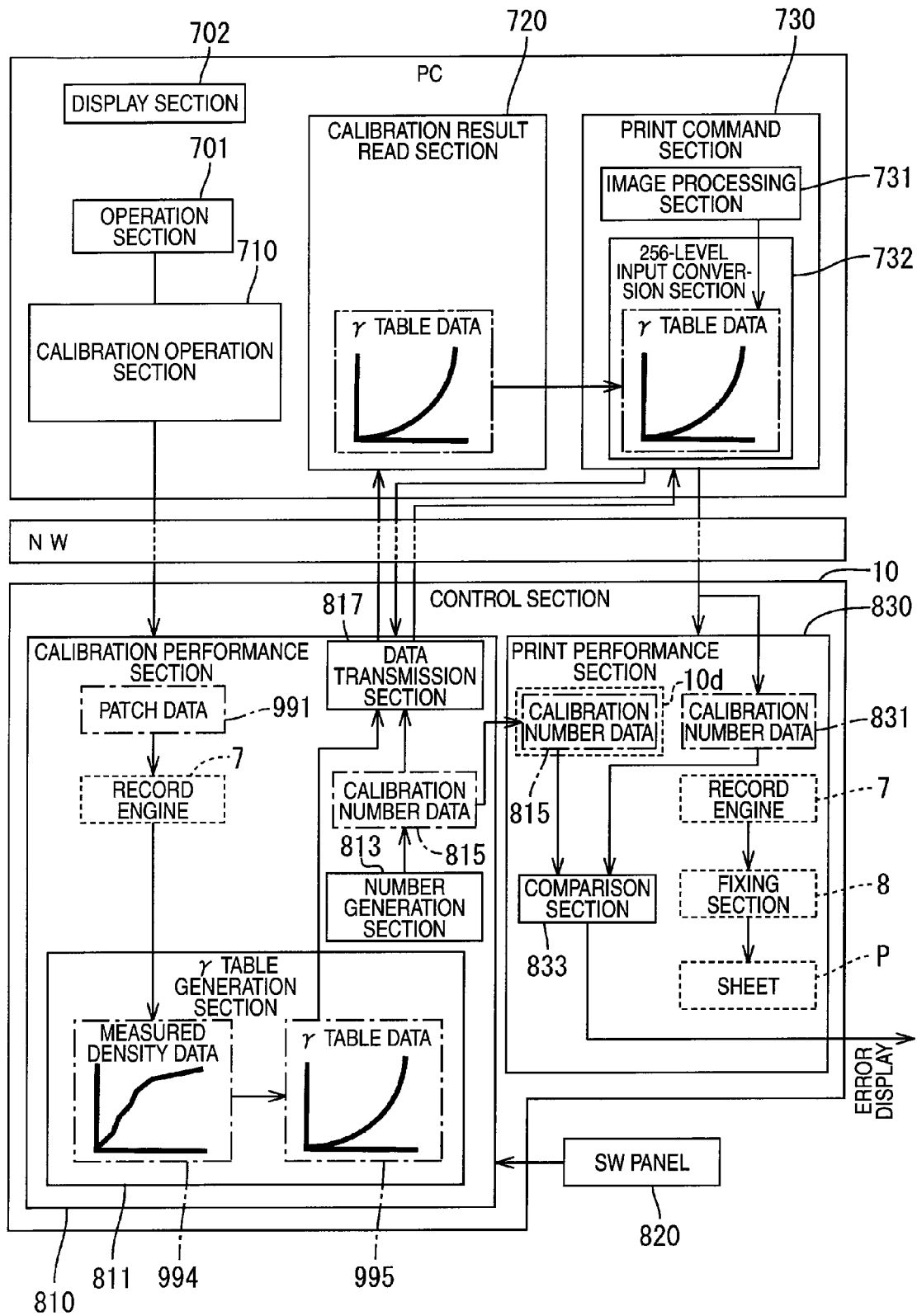
FIG. 5 is an example of a control block diagram of the print system of FIG. 1.

FIG. 5 is an example of a control block diagram of the print system according to an exemplary embodiment of the present embodiment. In FIG. 5, elements not included in the control section 10, such as the record engine 7, the fixing section 8, and the sheet P, are illustrated in broken lines. Variable data, such as the patch data 991, measured density data 994, and γ table data 995 corresponding to correction data of the present invention, are illustrated in a dashed line.

As shown in FIG. 5, the PC includes the operation section 701 including a keyboard, a mouse, and the like, and the display section 702 including a display, and the like.

The PC also has a calibration command section 710 that commands the control section 10 of the printer 1 to perform calibration in accordance with operation of the operation section 701 (e.g., operation corresponding to a display screen of the display section 702). Additionally, the PC has a calibration result read section 720 for reading a result of calibration performed by the printer 1 and a print command section 730 corresponding to output means of the present invention that commands the control section 10 of the printer 1 to perform printing.

In the PC, programs stored in the hard disk drive 20D and the CPU 20A implement features of the calibration command section 710, the calibration result read section 720, and the print command section 730. Their specific examples will be described later. The CPU 20A in the PC corresponds to a wait state maintain unit, a selection unit, and a determination unit.

The control section 10 of the printer 1 also includes a calibration performance section 810 that performs calibration and transmits a result of performance to the PC; and a print performance section 830 that drives the record engine 7, to thus print an image corresponding to the output data. The calibration performance section 810 transmits the patch data 991 to the record engine 7; measures the measurement patch 992 (FIG. 3) produced from the patch data by use of the density detection sensor 111; and receives resultant density measurement data 994.

Further, the calibration performance section 810 includes a γ table generation section 811 that is an example of a generation unit of the present invention for generating the γ table data 955 from the measured density data 994; and a number generation section 813 that generates a unique number (a calibration number) associated with the γ data table 995.

The calibration performance section 810 includes a data transmission section 817 corresponding to transmission unit of the present invention that associates the γ table data 995 with the calibration number data 815 of a unique number and that transmits the data as calibration data to the PC. The data transmission section 817 transmits in-progress calibration data, which will be described later, to the PC, and calibrated data as well.

In the printer 1, a program stored in the ROM 10B, and the like, and the CPU 10A work together as the calibration performance section 810, the print performance section 830, the γ table generation section 811, the number generation section 813, and the data transmission section 817, each of which will be described in more detail later.

In addition, a signal from a switch panel (SW panel) 820 that is provided on the printer 1 so as to make it possible to command calibration from the printer 1 can also be input to the calibration performance section 810.

FIG. 6 shows an example of the γ table data 995. The γ table data 995 are data for converting print data, which are generated by various applications on which are set 256-level densities for each color, into numerals conforming to a characteristic of the record engine 7. For instance, as illustrated in FIG. 6, the γ table data 995 sets 256 arithmetic progressions for each color.

In the exemplary embodiment shown in FIG. 6, if the density set for black (Black) is zero, data conversion is performed in such a way that zero is converted, as it is, into zero; that one is converted as-is into one; that two is converted into one; that three is converted into two; etc, . . . , whereby a desired image can be printed in accordance with the characteristic of the record engine 7. The data transmission section 817 is configured so as to transmit such a γ table data 995 together with the calibration number data 815.

Turning back to FIG. 5, the calibration result read section 720 of the PC stores the γ table data 995 received from the control section 10 into the hard disk drive 20D such that the print command section 730 can use the data.

The print command section 730 has an image processing section 731 that converts the print data produced by various applications into print data of 256 levels (8 bits). Moreover, the print command section 730 has a 256-level input conversion section 732 corresponding to a correction unit of the present invention that makes a correction to the thus-converted print data by use of the stored γ table data 995.

After being corrected by the 256-level input conversion section 732, the print data turn into output data to be output to the printer 1. The 256-level input conversion section 732 transmits the corrected output data to the control section 10 by way of the network NW.

In the exemplary embodiment, an unillustrated program stored in the hard disk drive 20D and the CPU 20A work together as the image processing section 731 and the 256-level input conversion section 732, and will be described in further detail later.

In the printer 1, the print performance section 830 of the control section 10 receives the output data and drives the record engine 7 and the fixing section 8 in accordance with the output data, thereby performing processing for printing on the sheet P an image corresponding to the output data.

First Exemplary Embodiment

Processing to be performed by the PC and the control section 10 according to a first exemplary embodiment of the present invention will be subsequently described by use of a flowchart.

<Calibration Performance Processing>

Figure 7:
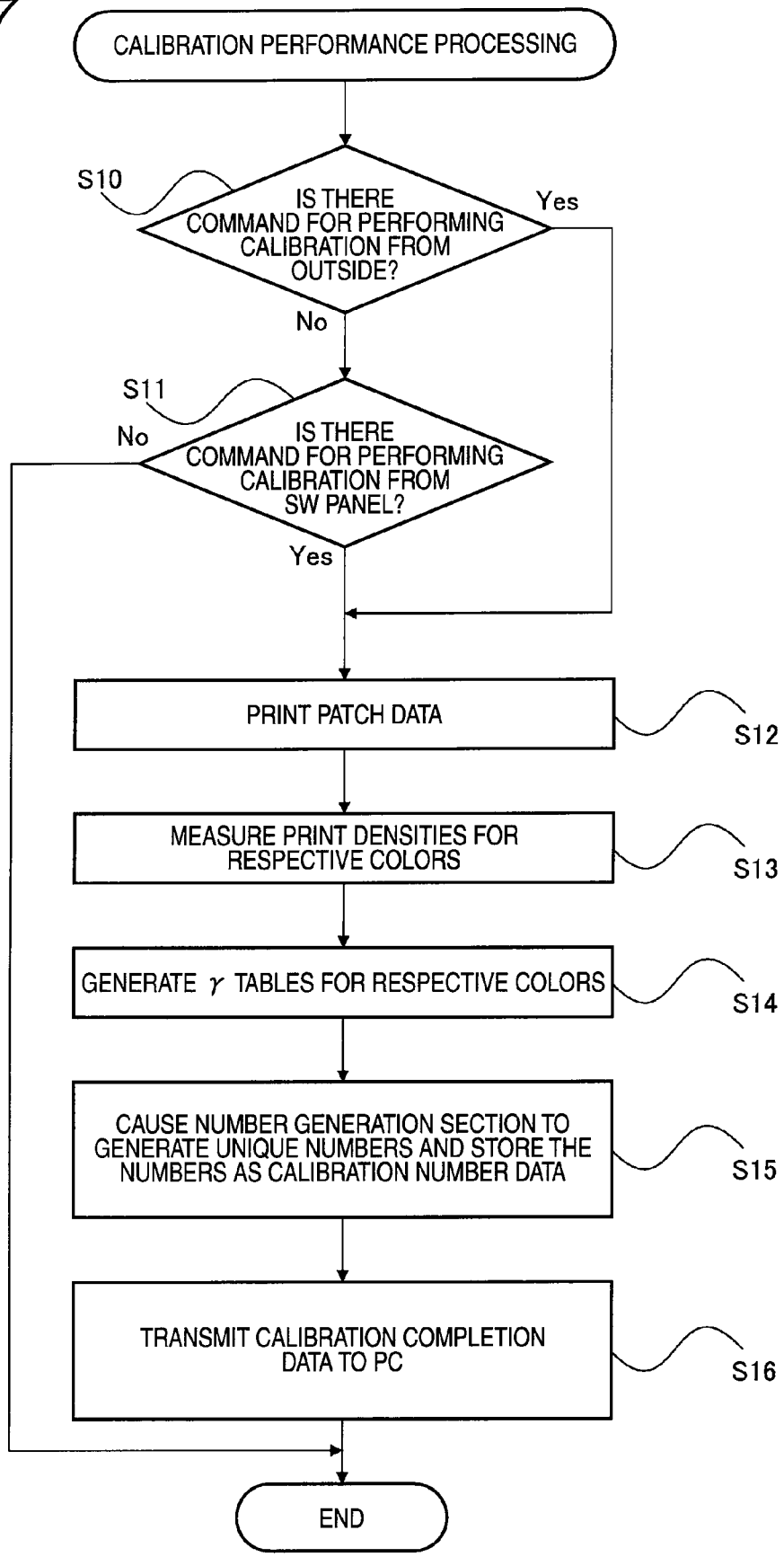
FIG. 7 is a flowchart illustrating calibration performance processing according to a first exemplary embodiment of the present invention that is performed by the printer of FIG. 1.

FIG. 7 is a flowchart illustrating calibration performance processing according to the first exemplary embodiment that is performed by the control section 10 of the printer 1. A program for performing calibration processing and the CPU 10A work together as the calibration performance section 810 (FIG. 5).

Calibration performance processing is processing that is periodically performed at short time intervals after power-on of the printer 1. When processing is commenced, a determination is first made in S10 as to whether or not a command for performing calibration has been received from an external PC.

When operation for conducting calibration has been performed by way of the operation section 701 (FIG. 5) of the PC, the calibration command section 710 transmits a calibration performance command to the printer 1. A program for transmitting a performance command in accordance with operation performed by way of the operation section 701 and the CPU 20A work together as the calibration command section 710. If it is determined that a calibration performance command has been transmitted from an external PC (YES in S10), processing proceeds to S12.

On the other hand, if it is determined that a calibration performance command has not been received from the external PC (NO in S10), a determination is made in S11 as to whether or not a command for performing calibration is received from the switch panel 820 (FIG. 5). If it is determined that a command is not received from the switch panel 820 either (NO in S11), processing ends.

In contrast, if it is determined that a command from the switch panel 820 is received (YES in S11), processing proceeds to S12. Specifically, in the configuration of the first exemplary embodiment, when a command for performing calibration is received from the outside (PC) or the switch panel 820, processing pertaining to S12, and S12 and subsequent operations are carried out. If not, processing is terminated.

In S12, the record engine 7 is driven in accordance with the patch data 991 as shown in FIG. 5, whereby a measurement patch 992 (FIG. 3) for respective colors is printed.

Subsequently, in accordance with a signal transmitted from the density detection sensor 111, the measured density data 994 that are print densities of respective colors making up the measurement patch 992 are measured in S13 in sequence of black, cyan, magenta, and yellow. The sequence in which the measured density data 994 are measured may also be some other order.

Figure 9:
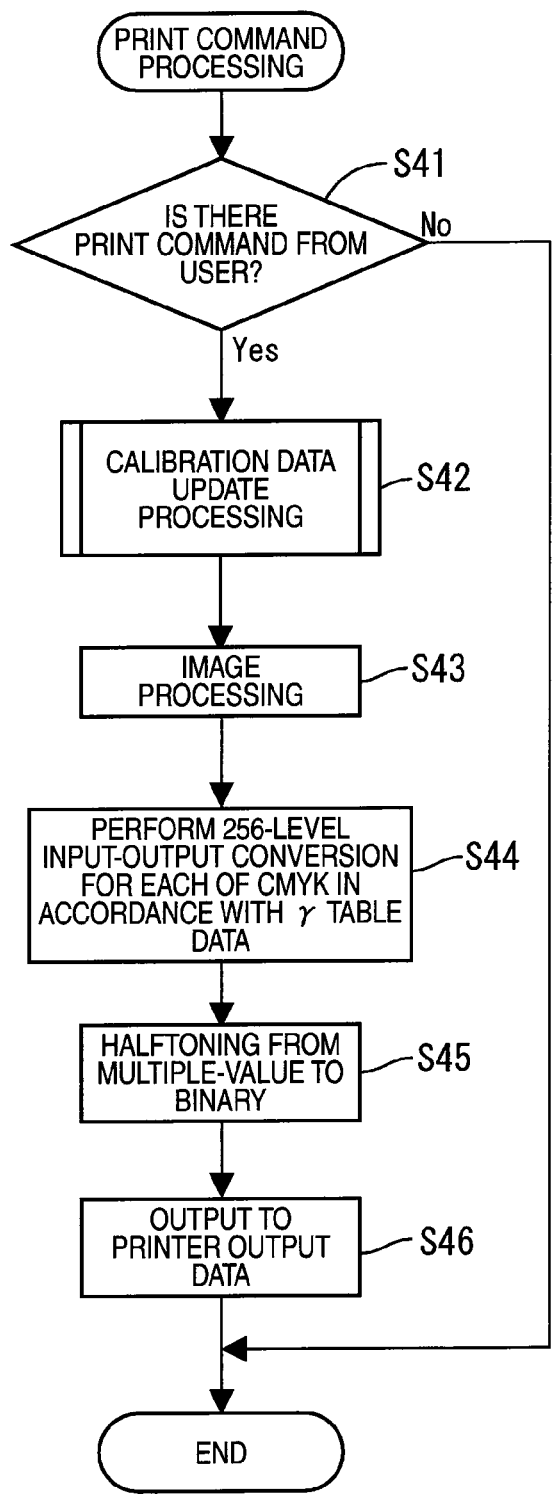
FIG. 9 is a flowchart for illustrating print command processing according to a first exemplary embodiment of the present invention that is to be performed by the computer of FIG. 1.

Subsequently, in S14, the γ table generation section 811 generates γ table data 995 of respective colors from the thus-measured measurement density data 994. The γ table data 995 are correction data used for color correction processing to be described later (S44: FIG. 9), and the CPU 10A generates such correction data.

When the γ tabled at a 995 of respective colors are prepared as mentioned above, processing then proceeds to processing pertaining to S15, where the number generation section 813 shown in FIG. 5 generates a unique number. Calibration number data 815 (FIG. 5) specifying the unique number is stored in the nonvolatile memory 10D. The unique number is a combination of printer identification information unique to the printer with information about the number of times calibration performed in the printer.

For instance, in a case in which the printer identification number is identification information "PRI100" and the information about the number of times calibration is performed is "0020" showing that the current calibration is the twentieth calibration performed by the printer, the unique number assumes "PRI1000020." Thus, the unique number is unique information achieved every time γ table data are generated. In an environment where the printer is coupled to a plurality of host computers by way of a network, it becomes possible to specify the source of color correction data on the basis of which color correction processing, which will be described in detail later, has been performed.

Further, the unique number has already taken on unique information for each γ table data in the printer 1. As a matter of course, a single unique number is not duplicated among a plurality of printers, and duplication of a single unique number is prevented in a single printer as well. Subsequently, calibration completion data showing completion of calibration is transmitted to all of the PCs coupled to the network NW in S16.

In the first exemplary embodiment, a program (omitted from the drawings) that counts the number of times calibration is performed and that combines the count with a printer identification number and the CPU 10A work together as the number generation section 813.

A calibration acquisition command according to the first exemplary embodiment is transmitted to the printer at an arbitrary timing by operating the PC. Upon receipt of the calibration acquisition command, the printer 1 is arranged in such a manner that the data transmission section 817 transmits the calibration data to the PC. However, the first exemplary embodiment is not limited to the transmission method.

Specifically, the calibration completion data are transmitted to the PC in S16. However, calibration data (the calibration number data 815 and the γ table data 995 in FIG. 5) may also be transmitted along with the calibration completion data. As a result of performance of such processing in S16, it becomes unnecessary for the PC to transmit the calibration data acquisition command to be described later. Therefore, calibration data can be automatically transmitted to the PC.

In the first exemplary embodiment, a duration from when the generation unit starts generation of correction data until when the transmission unit transmits the correction data corresponds to a duration in which processing from S12 to S16 is carried out. Processing pertaining to S16 referred to herein also includes transmission of calibration data along with the calibration completion data.

When performance of processing pertaining to S51 of FIG. 11, which will be described later, and receipt of a status confirmation command transmitted from the print command section 730 shown in FIG. 5 by the control section 10 are performed in a period during which processing from S12 to S16 is being performed, the data transmission section 817 transmits the in-progress calibration data.

In the first exemplary embodiment, performance of calibration is commanded through processing pertaining to S10 and S11. However, commanding may also be performed through processing other than processing pertaining to S10 and S11.

For instance, there may also be a configuration in which time information and print history information, such as the number of print operations, are stored in a storage section of the nonvolatile memory 10D, and the like, and the control section 10 periodically commands performance of calibration. Specifically, processing S12 to S16 may also be periodically performed in connection with calibration performance processing.

When performance of calibration is commanded through such processing, a user does not need to command performance of calibration, and hence management of print quality of the printer 1 is easy.

<Calibration Data Receipt Processing>

Figure 8:
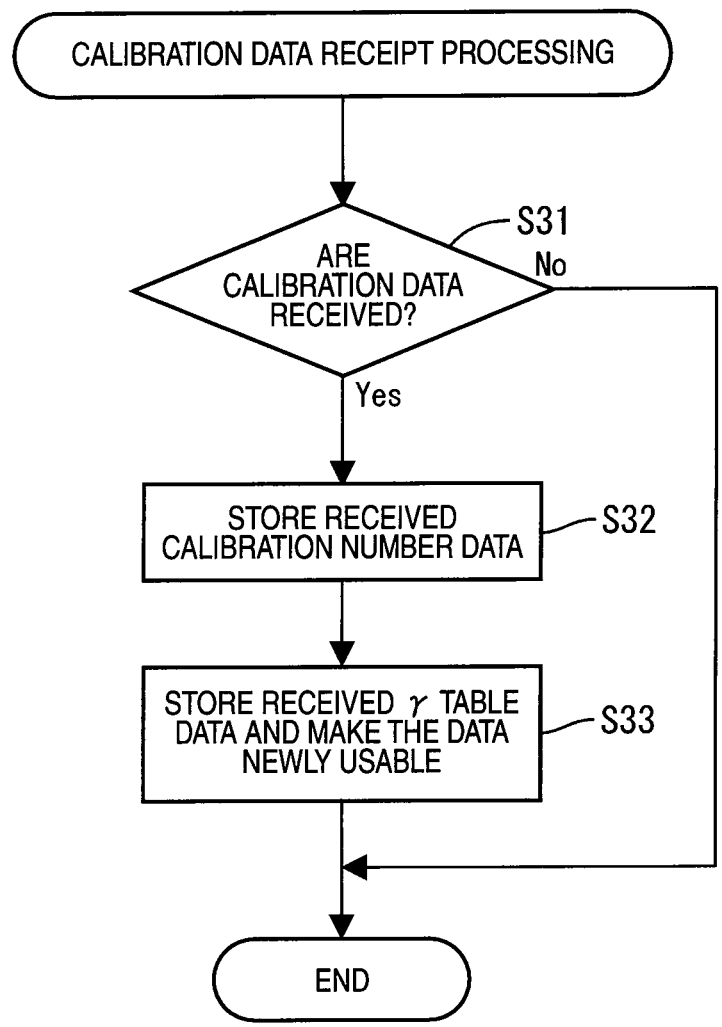
FIG. 8 is a flowchart illustrating calibration data receipt processing according to a first exemplary embodiment of the present invention that is performed by the computer of FIG. 1.

FIG. 8 is a flowchart illustrating calibration data receipt processing, showing processing to be executed by the PC. A program for performing processing pertaining to respective operations of calibration data receipt processing and the CPU 20A of the PC work together as the previously-described result read section 720 (FIG. 5).

Calibration data receipt processing of FIG. 8 is periodically performed at certain intervals. The intervals may be predetermined. After initiation of processing, a determination is first made in S31 as to whether or not calibration data (the γ table data 995 and the calibration number data 815 shown in FIG. 5) are received. If it is determined that the calibration data are not received (NO in S31), processing ends.

On the other hand, if it is determined that the calibration data are received (YES in S31), calibration number data are stored (S32). Next, the γ table data are stored in association with the calibration number data, thereby rendering the table data newly usable (S33).

<Print Command Processing>

Figures 1, 10:
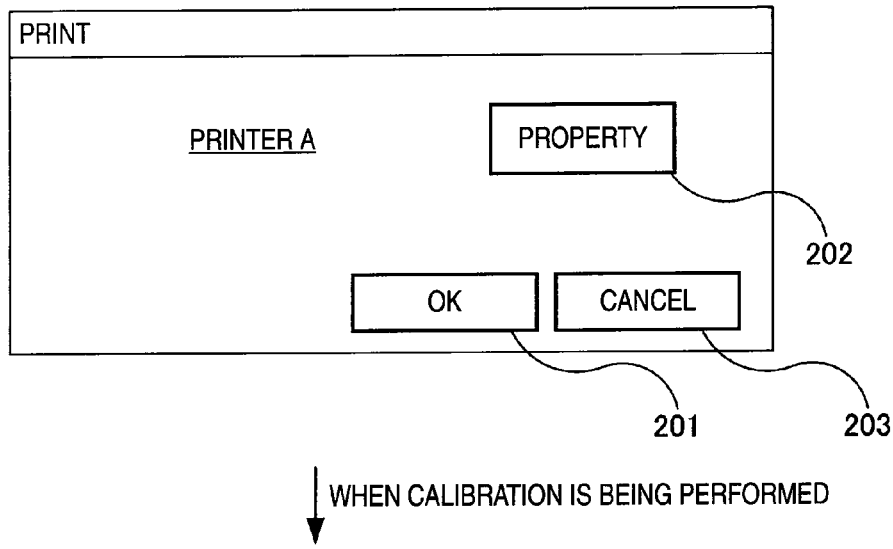
Figures 2, 10:
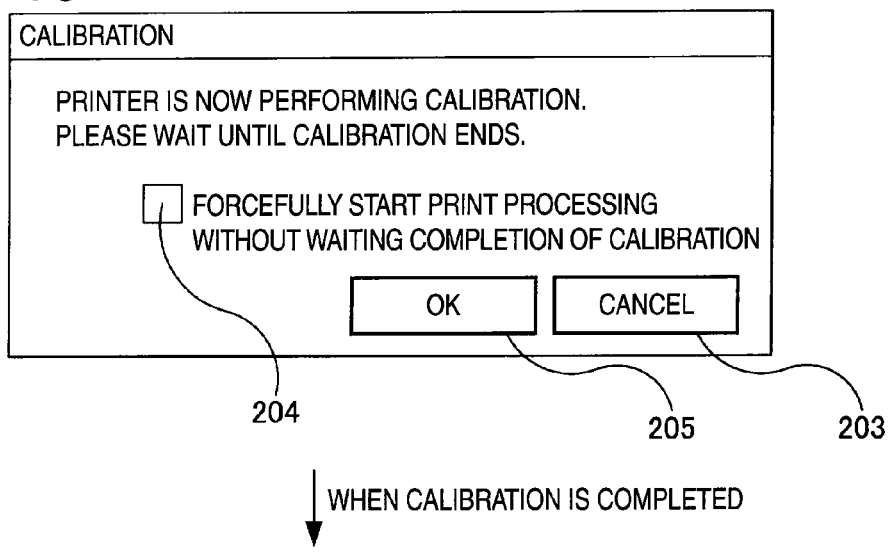
Figures 3, 10:
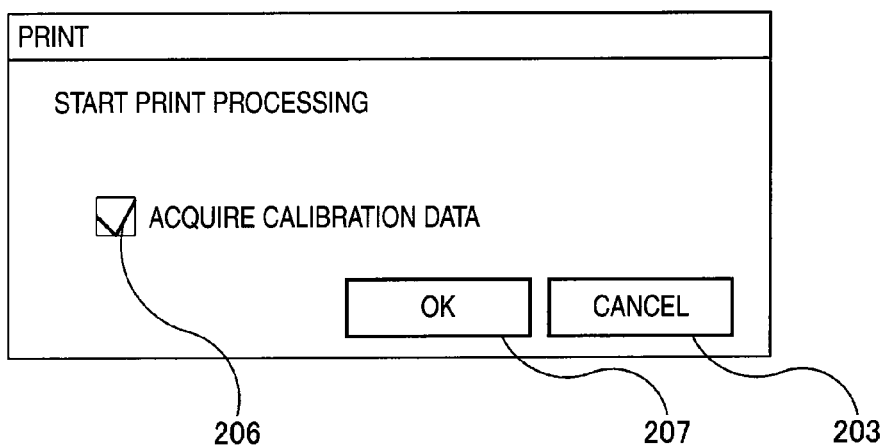

FIG. 9 is a flowchart illustrating print processing that is performed by the PC. A program performing processing pertaining to respective operations of print command processing and the CPU 20A of the PC work together as the print command section 730 shown in FIG. 5. FIGS. 10-1 to 10-3 show examples of display screens displayed on the display section 702 of the PC.

Print command processing shown in FIG. 9 is processing periodically performed at short time intervals. When processing is commenced, a determination is first made in S41 as to whether or not a print command is received. In relation to the determination pertaining to S41, it is determined that a print command to the printer 1 is issued from actuation of the operation section 701 and pressing of an OK button 201 in FIG. 10-1.

The word "printer A" denotes a designation of a specific target printer that transmits a print command. When a property button 202 is pressed, print settings of the printer A can be made. Further, when a cancel button 203 is pressed, print command processing is forcefully cancelled.

If it is determined that there is no print command at this time (NO in S41), processing ends.

On the other hand, if it is determined that there is a print command (YES in S41), calibration data update processing shown in a flowchart of FIG. 11, which will be described later, is performed in S42.

Subsequently, image processing is performed in S43, and the image processing section 731 converts data produced by the application into 256-level (8-bit) print data.

Processing pertaining to subsequent operation S44 corresponds to color correction processing. The 256-level input conversion section 732 subjects converted print data to color correction by use of the γ table data stored in S33 of FIG. 8. Data set in 256-level densities for respective C (cyan), M (magenta), Y (yellow), and K (black) colors are converted by use of the γ table data corresponding to respective colors, and the print data turn into output data.

In subsequent S45, the converted output data (256-level multiple-value data) are further converted into binary data corresponding to dot enable/dot disable.

Subsequently, the print command section 730 outputs output data to the printer 1 in S46, and processing ends.

In the configuration of the first exemplary embodiment, the PC serving as the host computer performs color correction processing as mentioned above. Hence, the burden of processing on the printer 1 is lessened.

In the first exemplary embodiment, processing for outputting output data to the printer 1 is automatically performed in S46, but there may also be adopted a configuration in which a user selects whether or not to perform this processing.

<Calibration Data Update Processing>

Figure 11:
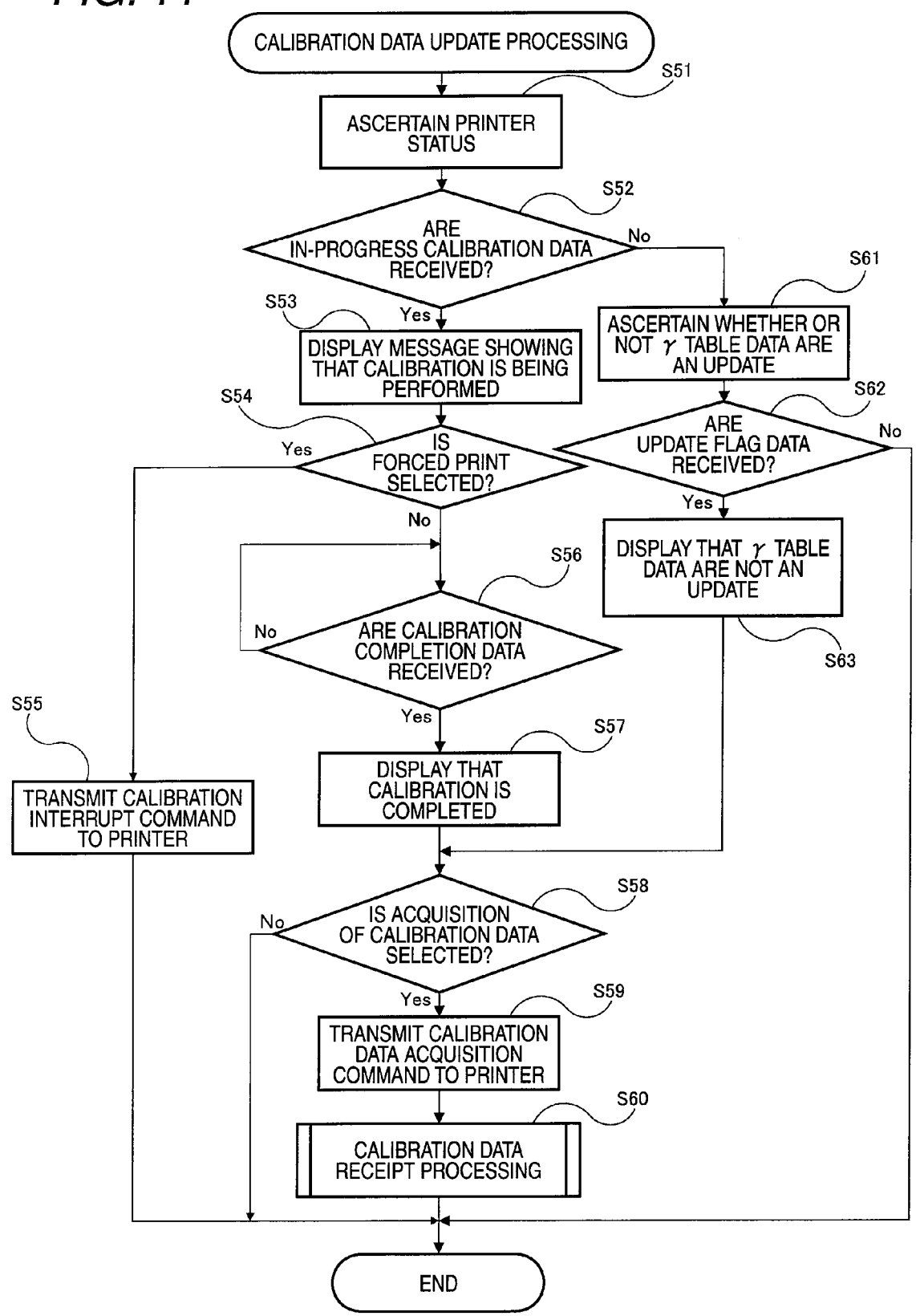
FIG. 11 is a flowchart illustrating calibration data update processing according to a first exemplary embodiment of the present invention that is performed by the computer of FIG. 1.

FIG. 11 is a flowchart illustrating calibration data update processing pertaining to S42 of FIG. 9, showing processing performed by the PC.

When calibration data update processing is performed in S42 of FIG. 9, the print command section 730 transmits a status confirmation command in S51, thereby ascertaining a status of the printer 1. As a result of a status being ascertained, it is ascertained whether or not the printer 1 is performing calibration performance processing.

Figure 12:
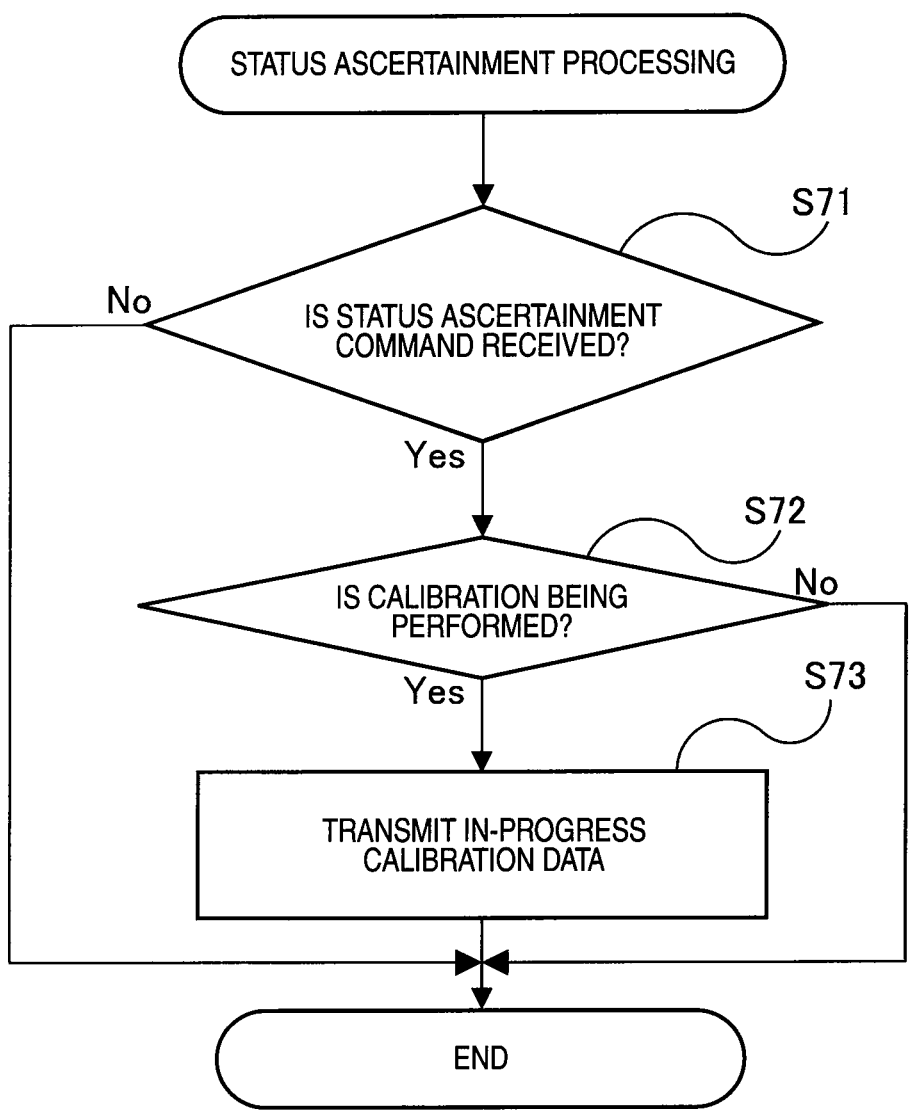
FIG. 12 is a flowchart illustrating status ascertainment processing according to a first exemplary embodiment of the present invention that is performed by the printer of FIG. 1.

When the status confirmation command is transmitted in S51 and when the printer 1 receives the command, the printer 1 performs status confirmation processing represented by the flowchart of FIG. 12.

In a flowchart shown in FIG. 12, a program that executes processing pertaining to respective operations of status confirmation processing and the CPU 10A of the printer 1 work together to ascertain the state of the calibration performance section 817 shown in FIG. 5.

First, the CPU 10A of the printer 1 determines whether or not the status confirmation command transmitted in S71 is received. If it is determined that there is not any status confirmation command (NO in S71), processing ends. On the other hand, if it is determined that there is a status confirmation command (YES in S71), a determination is made as to whether or not the printer 1 is performing calibration performance processing (processing from S12 to S16 in FIG. 7 is being performed) in S72.

If it is determined that calibration is being performed at this time (YES in S72), the data transmission section 817 transmits in-progress calibration data to the PC in S73. On the other hand, if it is determined that calibration is not being performed at this time, i.e., that the printer 1 is not in the middle of carrying out calibration performance processing (NO in S72), processing ends.

Returning now to FIG. 11, when the printer 1 completes status confirmation processing (i.e., when the processing in FIG. 12 is completed), confirmation of the status of the printer 1 is completed in S51 in FIG. 11. Subsequently, it is ascertained in S52 whether or not the print command section 730 in FIG. 5 has received the in-progress calibration data transmitted from the data transmission section 817 of the printer 1.

If it is determined that the in-progress calibration data have been received (YES in S52), a message showing that calibration is being performed is displayed on the display section 702 of the PC in S53, thereby informing a user that the printer 1 is performing calibration. FIG. 10-2 shows an example display on the display section 702 achieved through processing pertaining to S53.

Subsequently, a determination is made, in S54, as to whether or not forced print has been selected. Forced print is indicated when a compulsory print checkbox 204 shown in FIG. 10-2 is marked by operating the operation section 701 and an OK button 205 is pressed, whereby it is determined that forced print has been selected. The processing corresponds to processing to be performed by the selection unit of the present invention.

If it is determined that forced print has been selected (YES in S54), a calibration interrupt command is transmitted in S55 to the printer 1, thereby terminating the calibration data update processing. Processing then proceeds to S43 shown in FIG. 9. The printer 1 received the calibration interrupt command interrupts calibration.

On the other hand, if it is determined that the compulsory print checkbox 204 has not been marked as shown in FIG. 10-2 and the OK button 205 has been pressed (NO in S54), a wait state is kept until calibration performance processing of the printer 1 is completed in S56. Specifically, in S56, a determination is made as to whether or not calibration is complete. If it is determined that calibration completion data has not been received from the printer 1 (NO in S56), processing returns to S56. If it is determined that calibration completion data is received from the printer 1 (YES in S56), processing proceeds to S57. Thus, processing keeps continually proceeding to NO until calibration completion data are received from the printer 1. The processing corresponds to processing performed by wait state maintain unit of the present invention.

Since the printer 1 is in the middle of performing any of processing from S12 to S16 shown in FIG. 7 at this time, calibration completion data are finally transmitted in S16 shown in FIG. 7 to all of the PCs coupled to the network NW. Therefore, the print command section 730 of the PC receives the calibration completion data, and processing proceeds to S57.

During this time, if a cancel button 203 is pressed by operation of the operation section 701 in FIG. 10-2, the calibration data update processing and the print command processing are forcefully cancelled.

In S57, a message showing completion of calibration is displayed on the display section 702 of the PC, thereby informing a user that the printer 1 has finished calibration. An example display shown in FIG. 10-3 is then displayed on the display section 702. In S58, a determination is made as to whether or not acquisition of calibration data has been selected.

Figure 3:
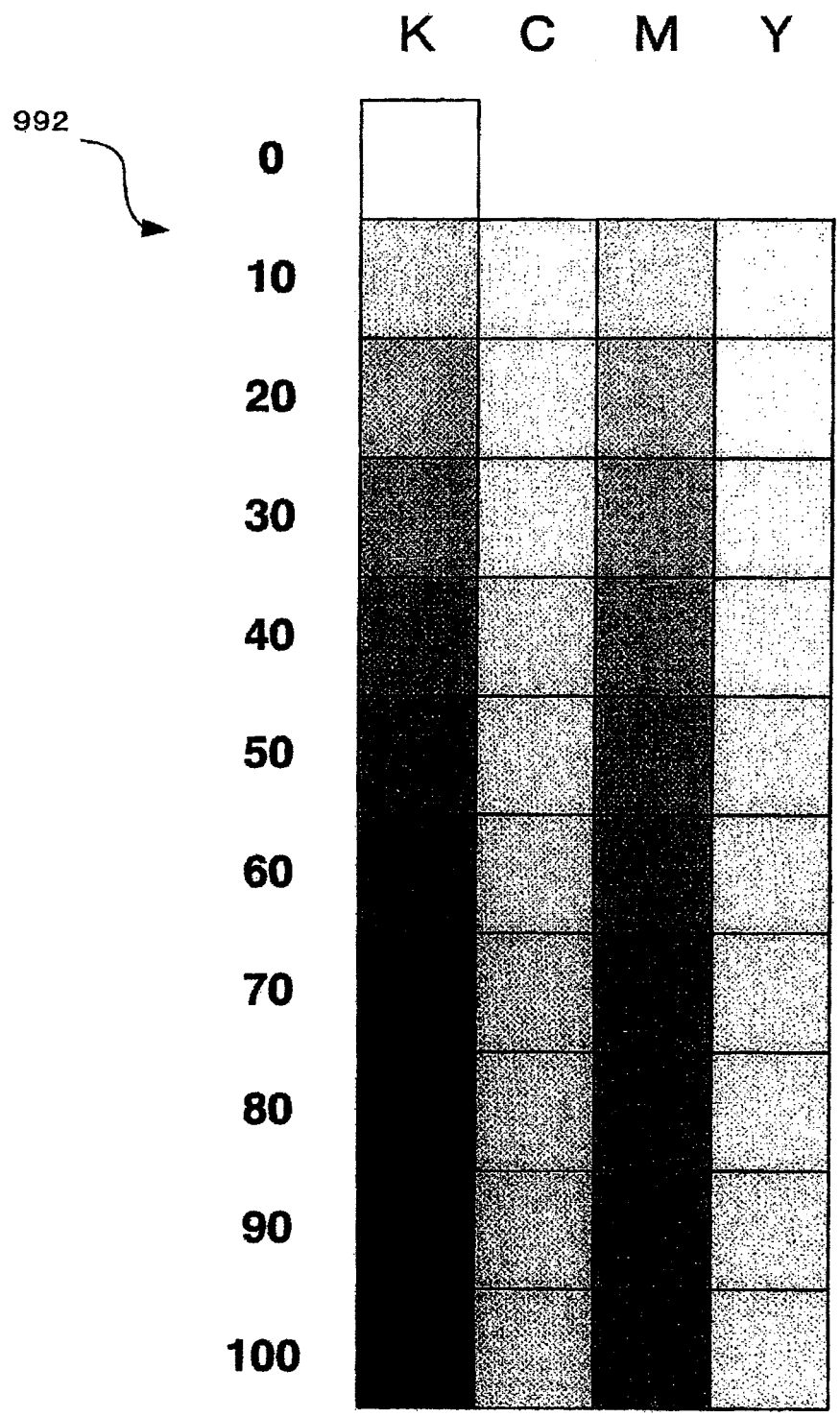
FIG. 3 is an explanatory view illustrating an example of a measurement patch.

A data acquisition checkbox 206 shown in FIG. 10-3 is marked by operating the operation section 701 and the OK button 207 is pressed, whereby it is determined that the acquisition of calibration data has been selected. If the OK button 207 is pressed without marking the data acquisition checkbox 206 shown in FIG. 10-3 by operating the operation section 701, it is determined that acquisition of calibration data has not been selected.

During this time, if the cancel button 203 is pressed by operating the operation section 701 in FIG. 10-3, the calibration data update processing and the print command processing are forcefully cancelled.

If it is determined that acquisition of calibration data has been selected (YES in S58), a calibration data acquisition command is transmitted in S59 to the printer 1. When the printer 1 receives the calibration data acquisition command, the calibration number data 815 for specifying a unique number generated by the number generation section 813 and the γ table data are associated with each other, and the data transmission section 817 transmits the thus-associated data to the PC.

In S60, calibration data receipt processing is commenced. Processing pertaining to S60 is analogous to the calibration data receipt processing provided in the flowchart shown in FIG. 8, and hence its explanation is omitted.

When the calibration data receipt processing is completed in S60, the calibration data update processing ends, and processing proceeds to S43 shown in FIG. 9.

On the other hand, in S58, if it is determined that acquisition of the γ table data has not been selected (NO in S58), the calibration data update processing is completed, and processing proceeds to S43 shown in FIG. 9.

When the status of the printer 1 is ascertained in S51 and it is determined in S52 that the in-progress calibration data are not received (NO in S52), the calibration number data stored in the hard disk drive 20D of the PC are transmitted to the printer 1 in S61, thereby ascertaining whether or not the γ table data are an update.

Figure 13:
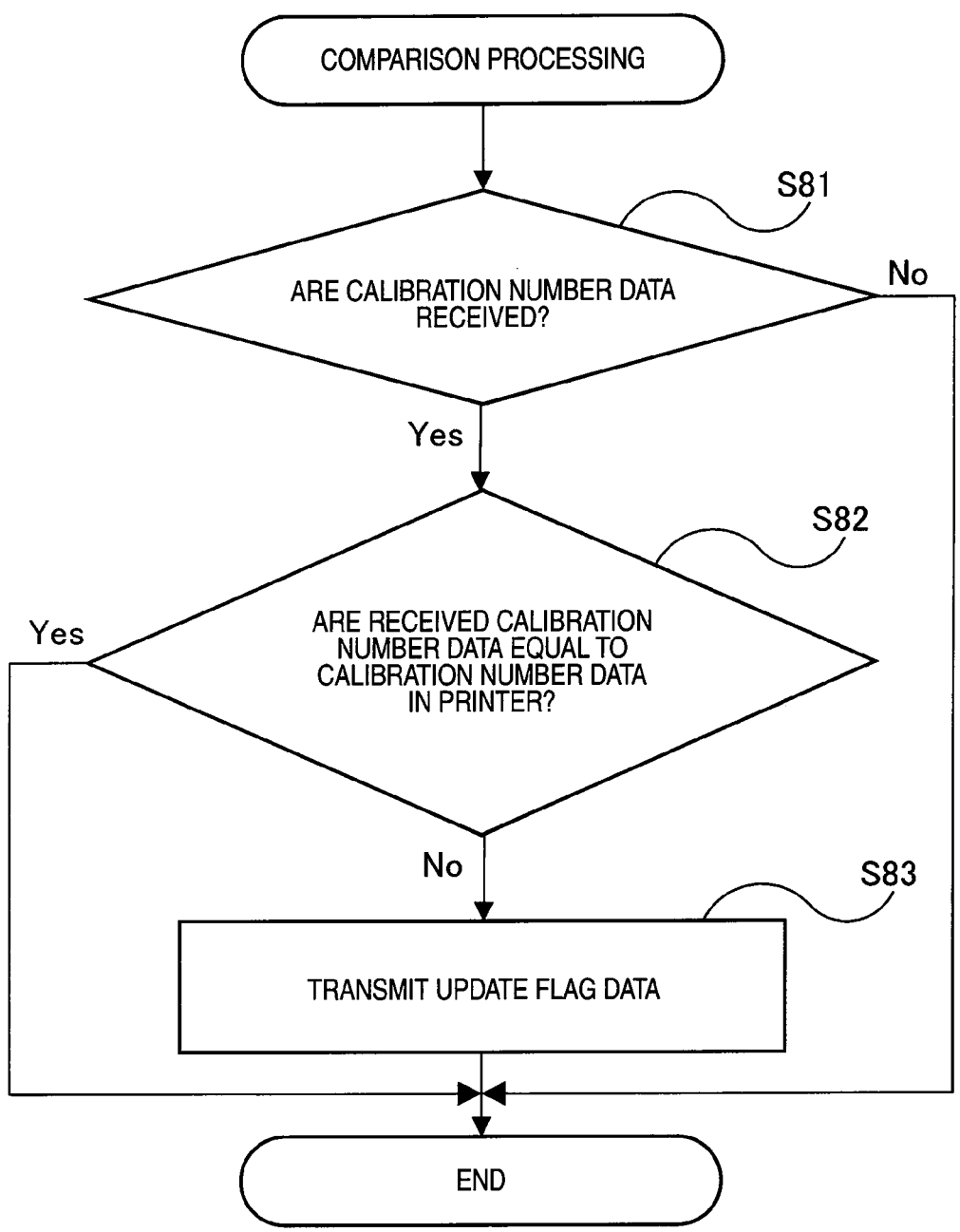
FIG. 13 is a flowchart illustrating comparison processing according to a first exemplary embodiment of the present invention that is performed by the printer of FIG. 1.

When the calibration number data are transmitted in S61, the printer 1 performs comparison processing for comparing the calibration number data provided in the flowchart shown in FIG. 13. In the flowchart shown in FIG. 13, a program that performs processing pertaining to respective operations of comparison processing and the CPU 10A of the printer 1 work as a comparison section 833 shown in FIG. 5.

First, it is determined in S81 whether or not the printer 1 has received the calibration number data from the PC. If it is determined that the calibration number data are not received (NO in S81), processing ends. On the other hand, if it is determined that the calibration number data are received (YES in S81), a determination is made in S82 whether or not the thus-received calibration number data (the received calibration number data 831) are equal to data in the printer; namely, the update calibration number data 815 stored in the nonvolatile memory 10D.

If it is determined that the received calibration number data 831 are not equal to the update calibration number data 815 (NO in S82), update flag data showing that the received calibration number data are not the update calibration number data 815 are transmitted to the PC. On the other hand, if it is determined that the received calibration number data 831 are equal to the update calibration number data 815 (YES in S82), processing ends.

Returning to FIG. 11, when the printer 1 finishes comparison processing (processing shown in FIG. 13), a determination is made in S62 as to whether or not update flag data are received from the printer 1.

If it is determined that the update flag data are not received at this time (NO in S62), calibration data update processing ends. On the other hand, if it is determined that update flag data are received (YES in S62), a message showing that the γ table data are not an update is displayed in S63 on the display section 702. Processing proceeds to S58 and subsequent operations. Subsequently, a selection shown in FIG. 10-3 is performed by operating the operation section 701, whereby processing pertaining to S58 and subsequent operations is performed.

Calibration data update processing is performed as mentioned above, and the γ table data are updated to data appropriate for the user, and subsequent print command processing is performed.

In the first exemplary embodiment, the user selects whether or not to acquire update γ table data at the time of processing pertaining to S58. However, processing pertaining to S58 may also be caused to forcefully proceed to YES, and processing for acquiring update γ table data may also be automatically performed in S59. As a result of processing being performed as mentioned above, the update γ table data can be quickly acquired.

The PC that receives calibration data transmitted from the printer 1 may also be all PCs coupled to the printer 1 by way of a LAN, and the like, or PCs previously registered in the printer 1. Moreover, calibration data may also be transmitted solely to a PC that performed the calibration data update processing. Data communication traffic can be saved by transmitting calibration data solely to a specific PC.

<Print Processing>

Print processing will now be described.

An overview of print processing will now be described by reference to FIG. 5. The printer 1 of the first exemplary embodiment receives the output data underwent color correction processing in the PC, and the print performance section 830 drives the record engine 7 and the fixing section 8 in accordance with the output data, thereby printing an image corresponding to the output data on the sheet P.

Figure 14:
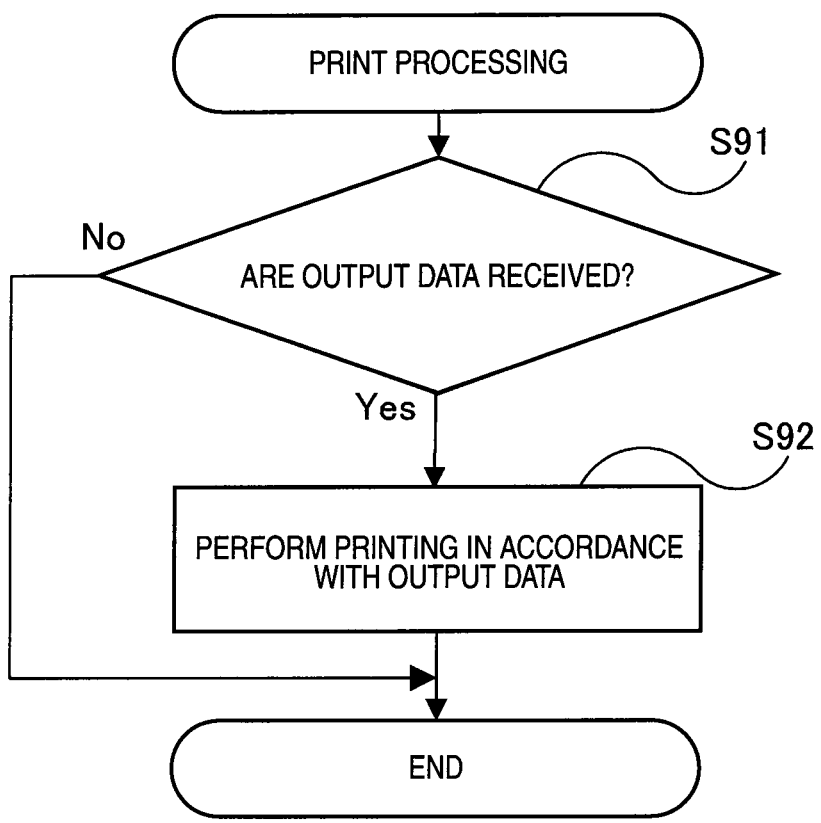
FIG. 14 is a flowchart illustrating print processing according to a first exemplary embodiment of the present invention that is performed by the printer of FIG. 1.

FIG. 14 is a flowchart illustrating print processing. Print processing is periodically performed at short time intervals. When processing is commenced, a determination is made in S91 as to whether or not output data from the PC are received. If it is determined that output data are not received (NO in S91), processing ends. On the other hand, if it is determined that output data are received (YES in S91), printing is performed in S92.

Descriptions of processing of the first exemplary embodiment performed by the PC and the control section 10 of the exemplary embodiment are thus completed. In the first exemplary embodiment, the state of calibration of the printer 1 can be ascertained before the PC outputs data, and hence wasteful output of data can be prevented.

Second Exemplary Embodiment

Subsequently, processing performed by the PC and the control section 10 according to a second exemplary embodiment of the present invention will be described by use of a flowchart.

In the second exemplary embodiment, calibration performance processing and calibration receipt processing are analogous to their counterpart processing operations of the first exemplary embodiment described above, and hence their explanations are omitted. Explanations about processing analogous to that of the first exemplary embodiment are omitted in connection with print command processing, calibration data update processing, and print processing.

<Print Command Processing>

Figure 15:
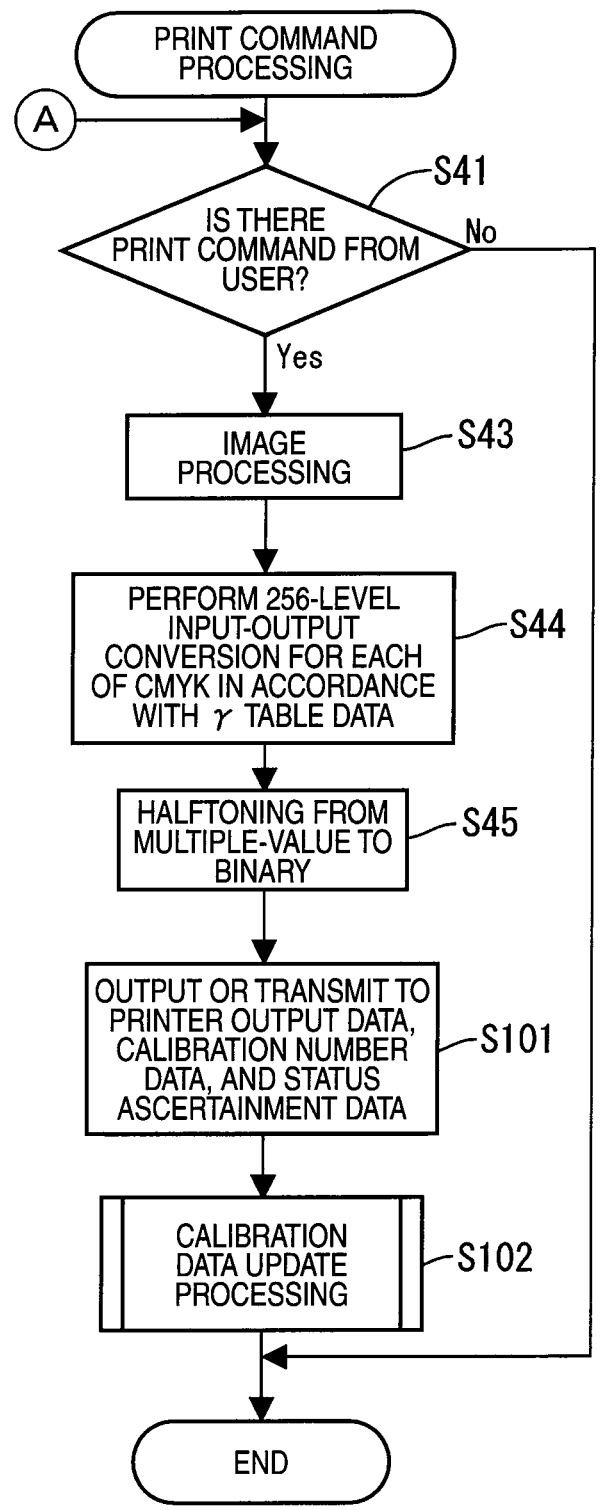
FIG. 15 is a flowchart illustrating print command processing according to a second exemplary embodiment of the present invention that is performed by the computer of FIG. 1.

FIG. 15 is a flowchart illustrating print processing, showing processing to be performed by the PC. A program for performing processing pertaining to respective operations of print command processing and the CPU 20A of the PC work together as the print command section 730 shown in FIG. 5. FIG. 10 shows an example display screen to be displayed on the display section 702 of the PC.

Print command processing shown in FIG. 15 is processing to be periodically performed at short time intervals. When processing is commenced, a determination is first made in S41 as to whether or not a print command is received as in S41 shown in FIG. 9.

If it is determined that there is no print command at this time (S41), processing ends.

If it is determined that there is a print command (YES in S41), processing is sequentially performed from processing pertaining to S43. Processing pertaining to S43 to S45 is analogous to processing pertaining to S43 to S45 that are the same operations as those shown in FIG. 9, and hence their explanations are omitted.

When processing pertaining to S45 is completed, the print command section 730 outputs or transmits the output data, the calibration number data stored in the hard disk drive 20D of the PC, and the status confirmation command toward the printer 1, whereupon processing ends in S101.

Subsequently, calibration data update processing represented by the flowchart shown in FIG. 16 to be described later is performed in S102. After completion of processing, print command processing ends.

As in case with the first exemplary embodiment, in the configuration of the second exemplary embodiment, the PC serving as the host computer performs color correction processing as mentioned above. Hence, the burden of processing on the printer 1 is lessened.

In the second exemplary embodiment, processing for outputting or transmitting the output data, the calibration number data, and the status confirmation command to the printer 1 is automatically performed in S101. However, there may also be adopted a configuration in which the user makes a selection as to whether or not to perform processing.

<Calibration Data Update Processing>

Figure 16:
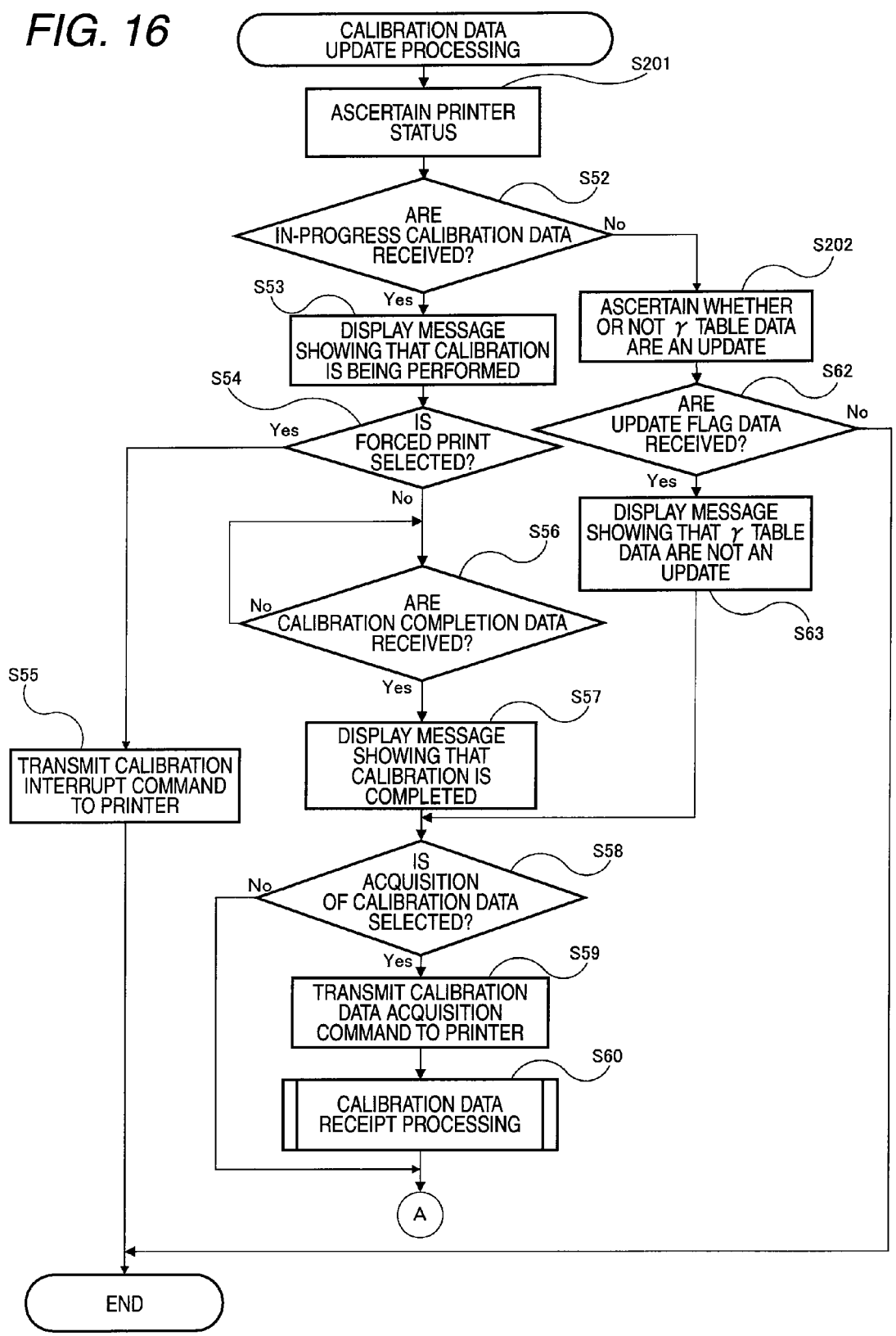
FIG. 16 is a flowchart illustrating calibration data update processing according to a second exemplary embodiment of the present invention that is performed by the computer of FIG. 1.

FIG. 16 is a flowchart illustrating calibration data update processing pertaining to S102 of FIG. 15, showing processing performed in the PC.

Calibration data update processing is performed in S201 shown in FIG. 16, and the status of the printer 1 is ascertained in S201. As a result of ascertainment of the status, it is ascertained whether or not the printer 1 is performing calibration performance processing.

In processing pertaining to S201, the printer 1 receives a status ascertainment command transmitted in S101 shown in FIG. 15, to thus receive in-progress calibration data transmitted in S73 shown in FIG. 17 to be described later. A determination is thus made as to whether or not the printer 1 is performing calibration performance processing.

When the ascertainment of status of the printer 1 is completed in S201, a determination is made in subsequent S52 as to whether or not the print command section 730 shown in FIG. 5 has received the in-progress calibration data transmitted from the data transmission section 817 of the printer 1, as in processing pertaining to S52 shown in FIG. 11.

If it is determined that the in-progress calibration data have been received (YES in S52), a message showing that calibration is being performed is displayed on the display section 702 of the PC, as in S53 of FIG. 11, thereby notifying that the printer 1 is in the course of performance of calibration.

Subsequently, in S54, a determination is made as to whether or not the user has selected forced print, as in S54 of FIG. 11.

If it is determined that forced print has been selected (YES in S54), a calibration interrupt command is sent to the printer 1 as in S55 shown in FIG. 11, whereupon calibration data update processing is terminated, and print command processing is also terminated. The printer 1 received the calibration interrupt command interrupts calibration in S303 shown in FIG. 17 which will be described later.

On the other hand, if it is determined that forced print is not selected (NO in S54), processing for holding a wait until calibration of the printer 1 is completed and processing for acquiring calibration data are performed in S56 to S60, as in S56 to S60 of FIG. 11.

When calibration data receipt processing pertaining to S60 is completed, calibration data update processing ends, and processing proceeds to S41 of FIG. 15.

When the status of the printer 1 is ascertained in S201, and thereafter it is determined that the in-progress calibration data are not received (NO in S52), a determination is made in S202 as to whether or not the γ table data stored in the hard disk drive 20D of the PC are an update.

In processing pertaining to S202, the printer 1 receives the calibration number data transmitted in S101 of FIG. 15, whereby update flag data transmitted in S83 of FIG. 17 to be described later are received. Thus, it is ascertained whether or not the γ table data are an update.

When checking whether or not the γ table data are an update is completed in S202, a determination is made in S62 as to whether or not update flag data are received from the printer 1, as in processing pertaining to S62 of FIG. 11.

If it is determined that update flag data are not received at this time (NO in S62), calibration data update processing ends, and print command processing also ends. On the other hand, when update flag data are received (YES in S62), a message showing that the γ table data are not an update is displayed on the display section 702, as in S63 of FIG. 11, and processing proceeds to S58 and subsequent operations. Processing pertaining to S58 and subsequent operations is then performed.

As mentioned above, calibration data update processing is performed, and the γ table data are updated to data appropriate for the user, and subsequent print command processing is performed.

In the second exemplary embodiment, the user makes a selection as to whether or not to acquire update γ table data at the time of processing pertaining to S58. However, processing pertaining to S58 may forcefully proceed to YES, and processing for acquiring update γ table data pertaining to S59 and S60 may also be automatically performed. As a result of processing being performed as mentioned above, update γ table data can be quickly acquired.

The PC to which calibration data are transmitted from the printer 1 may also be all PCs coupled to the printer 1 by way of a LAN, or the like, or PCs previously registered in the printer 1. Moreover, calibration data may also be transmitted solely to a PC that has performed calibration data update processing. A data traffic volume can also be saved by transmitting calibration data solely to a specific PC.

In the second exemplary embodiment, when processing proceeds to NO in S58 or when processing pertaining to S60 is completed, processing proceeds to S41 shown in FIG. 15; however, processing may also proceed to S43. As a result of processing proceeding as mentioned above, the print command need not be performed again; hence, a burden imposed on a user as a result of print command processing being performed under the print command is lessened.

<Print Processing>

Print processing will now be described.

An overview of print processing is described by reference to FIG. 5. The printer 1 of the exemplary embodiment receives output data subjected to color correction processing in the PC; and the print performance section 830 drives the record engine 7 and the fixing section 8 in accordance with the output data, thereby printing an image corresponding to the output data on the sheet P.

Figure 17:
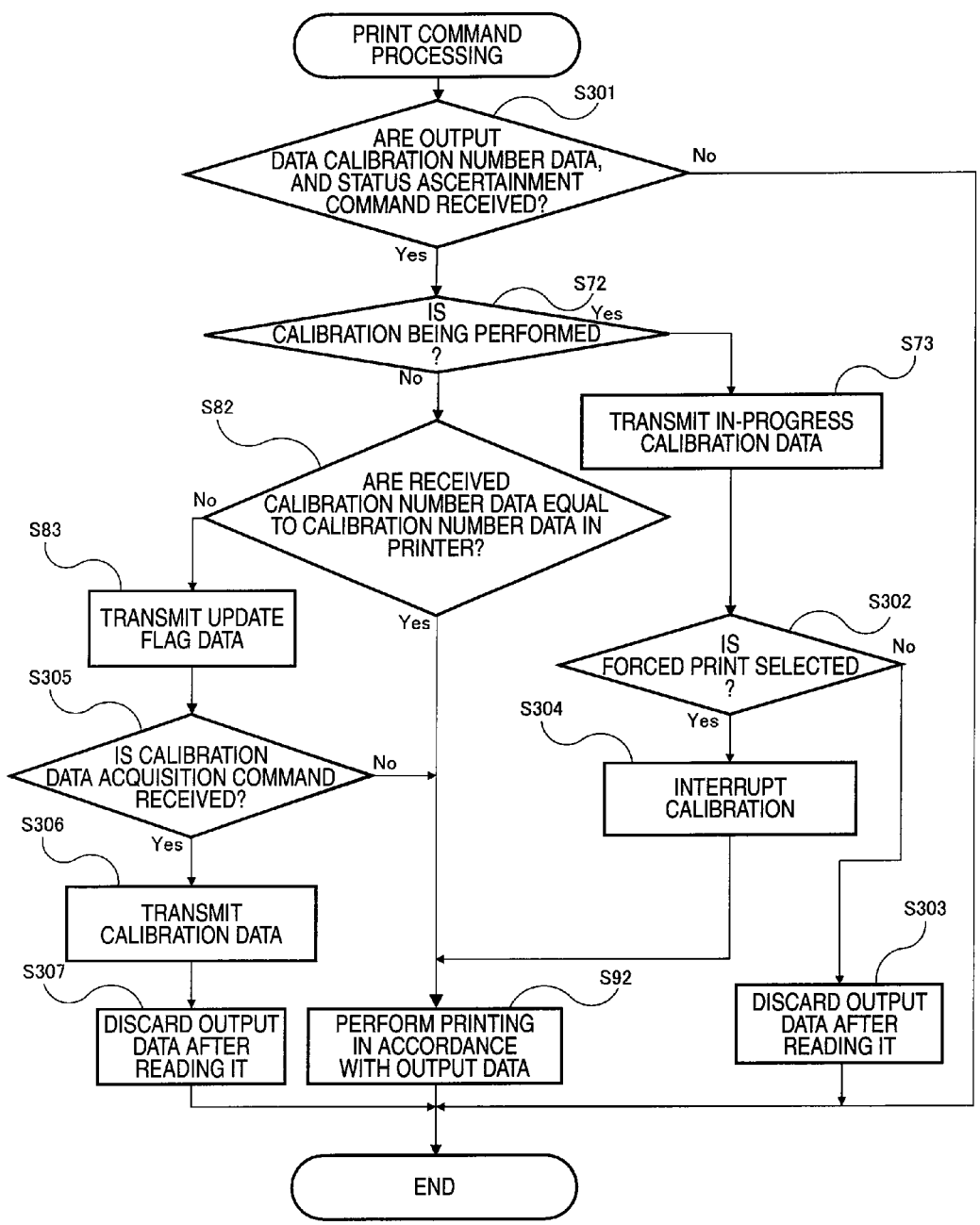
FIG. 17 is a flowchart illustrating print processing according to a second exemplary embodiment of the present invention that is performed by the printer of FIG. 1.

FIG. 17 is a flowchart illustrating print processing, and the CPU 10A performs the processing. Print processing of the second exemplary embodiment is periodically performed at short time intervals. First, when processing is commenced, a determination is made in S301 as to whether or not the output data, the calibration number data, and the status ascertainment command are received from the PC. If it is determined that the data and the command are not received (NO in S301), processing ends.

On the other hand, if it is determined that the data and the command are received (YES in S301), status ascertainment processing is performed in S72. The program that performs status ascertainment processing and the CPU 10A of the printer 1 ascertain the status of the calibration performance section 817 shown in FIG. 5.

Next, a determination is made in S72 as to whether or not the printer 1 is in the course of execution of calibration performance processing, as in processing pertaining to S72 of FIG. 12.

If it is determined that the printer is in the course of performance of calibration (YES in S72), the data transmission section 817 transmits in S73 the in-progress calibration data to the PC, as in S73 of FIG. 12. Processing pertaining to S52 of FIG. 16 is determined by transmission of the in-progress calibration data performed in S73.

When processing pertaining to S73 is performed, a determination is made as to whether or not forced print is selected in S302. The determination is made on the basis of whether or not the calibration interrupt command transmitted by means of processing pertaining to S55 of FIG. 16 is received.

If it is determined that the calibration interrupt command has not been received (NO in S302), the output data are discarded after being read in S303. Processing pertaining to S303 corresponds to processing to be performed by the wait state maintain unit.

On the other hand, if it is determined that the calibration interrupt command has been received (YES in S302), calibration performance processing of the printer 1 shown in FIG. 7 is interrupted in S304. Subsequently, printing is performed in S92 on the basis of the output data as in S92 of FIG. 14.

In S72, if it is determined that the printer is not in the process of calibration (NO in S72), a determination is made in S82 as to whether or not the calibration number data (received calibration number data 831) received in S301 are equal to data in the printer; namely, update calibration number data 815 stored in the nonvolatile memory 10D, as in S82 of FIG. 13.

If it is determined that the received calibration number data 831 are equal to the update calibration number data 815 (YES in S82), printing is performed on the basis of the output data in S92.

On the other hand, if it is determined that the received calibration number data 831 are not equal to the update calibration number data 815 (NO in S82), update flag data showing that the received calibration data are not the update calibration number data 815 are transmitted to the PC as in S83 of FIG. 13. The update flag data transmitted in S83 are utilized in processing pertaining to S202 of FIG. 16.

Subsequently, a determination is made in S305 as to whether or not the calibration data acquisition command has been received. The determination is performed on the basis of a determination as to whether or not the calibration data acquisition command transmitted through processing pertaining to S59 shown in FIG. 16 is received.

If it is determined that the calibration data acquisition command has not been received (NO in S305), printing is performed on the basis of the output data in S92.

On the other hand, if it is determined that the calibration data acquisition command is received (YES in S305), the calibration data are transmitted to the PC in S306. The calibration data are utilized for processing pertaining to S60 of FIG. 16. Next, the output data are discarded after being read in S307. Processing pertaining to S307 is processing to be performed by the wait state maintain unit.

As mentioned above, in the processing according to the second exemplary embodiment performed by the PC and the control section 10, the PC outputs output data without ascertaining the state of calibration of the printer 1. Therefore, when calibration is not performed, the printer 1 does not transmit in-progress calibration data; hence, printing is performed more quickly.

Other Exemplary Embodiments

The present invention is not limited to the exemplary embodiments described by reference to the descriptions and the drawings. For example, other exemplary embodiments, such as those provided below, also fall within the technical scope of the present invention.

For example, although a laser printer is mentioned as an example of a printer, the present inventive concept can be applied to other types of printers, such as inkjet printers, facsimile machines, and multifunction machines having a printer function, a copier function, a facsimile function, and the like.

Moreover, although the print system has been described by taking, by way of example, correction based on color correction processing (calibration) for correcting a color density, the present inventive concept can also be applied to a print system that makes a correction through position correction processing (registration) for correcting a positional displacement.

In the above described exemplary embodiments, although the γ table data are illustrated as color correction data transmitted from the printer to the host computer, the previous measured density data serving as a basis for generating the γ table data and other data may also be provided. In this case, it is advantageous to make an arrange such that the host computer generates the γ table data from the measured density data transmitted from the printer. The generation unit which generates color correction data may also comprise units which generate the γ table data, as in the above exemplary embodiments, or units for detecting the density patch, to thus generate measured density data.

In the above described exemplary embodiments, a determination is made, from the update calibration number data stored in the printer 1 and the calibration number data associated with output data, as to whether or not color correction processing is appropriate. However, a determination may also be made without use of such identification information. For instance, transmission history of color correction data is previously stored in the printer (e.g., history data showing when γ table data was transmitted to a PC). On the basis of the transmission history, a determination is made as to whether or not the color correction data used for the host computer are update color correction data. When the color correction data are not update color correction data, inappropriate color correction processing may also be deemed to have been performed.

The above described exemplary embodiments illustrate an example in which the "identification information" is generated by the printer, but the information may also be generated by a host computer. For instance, a date and time when color correction data (e.g., the foregoing γ table data) was acquired from a printer is stored in a host computer as identification information, and a date and time when the data was acquired in association with output data is transmitted to the printer from the host computer at the time of printing. The printer may compare the "date and time when the host computer acquired the color correction data" with a "date and time when the printer updated color correction data," thereby determining whether or not color correction processing is based on the update color correction data.

Although the above described exemplary embodiments illustrate an example in which the determination unit and the wait state maintain unit are provided on the printer, the determination unit and the wait state maintain unit may alternatively be provided on the host computer. For instance, an inquiry is made from the PC to the printer after the PC has performed color correction processing (or before the PC performs color correction processing); the PC determines whether or not the color correction processing is performed on the basis of update color correction data. If the color correction processing is not based on the update, processing for not transmitting output data to the printer (e.g., transmitting an error signal) may also be performed.

According to one or more illustrative aspects of the present invention, a print system is provided which comprises a printer including a print unit which generates an image on a sheet from output data, a generation unit that generates correction data for use in correcting print data, and a transmission unit that transmits the correction data to a computer. The computer includes a correction unit that corrects the print data in accordance with the correction data transmitted from the transmission unit, to thus generate the output data, an output unit that outputs the output data to the printer, wherein the print system includes a wait state maintain unit that inhibits printing of the output data corrected in accordance with the correction data generated before a period from when generation of the correction data is commenced by the generation unit until when the transmission unit transmits the correction data.

According to one or more illustrative aspects of the present invention, after the generation unit has generated the correction data, the correction unit may generate the output data from the correction data.

According to one or more illustrative aspects of the present invention, the output unit may output the output data at a time at which the output data is generated by the generation unit.

According to one or more illustrative aspects of the present invention, the transmission unit may transmit the correction data to the computer when the correction data is generated by the generation means.

According to one or more illustrative aspects of the present invention, the transmission unit may transmit the correction data to the computer that has commanded the printer to perform printing.

According to one or more illustrative aspects of the present invention, the print system may further comprise a selection unit which selects whether or not the wait state maintain unit maintains a wait state so as not to start a printing.

According to one or more illustrative aspects of the present invention, a program is provided which causes a computer to perform as correction unit that corrects print data in accordance with correction data, thereby generating output data; an output unit that outputs the output data generated by the correction means to a printer; a determination unit that determines whether or not a current period is a period from when the printer starts generation of the correction data until when transmission of the correction data is performed; and a wait state maintain unit that is configured to prevent the output unit from transmitting the output data when the determination unit determines that the current period is a period from when the printer starts generation of the correction data until when transmission of the correction data is performed.

According to one or more illustrative aspects of the present invention, a printer is coupled to a computer having a correction unit that corrects print data in accordance with correction data, to thus generate output data, the printer comprising a print unit that generates an image on a sheet in accordance with the output data; a generation unit that generates the correction data for use in correcting the print data; a transmission unit that transmits the correction data to the computer; and a wait state maintain unit that is configured to maintain a wait state so as not to start a printing of the output data corrected in accordance with the correction data generated before a period from when the generation unit commences generation of the correction data until when the transmission means transmits the correction data.

The correction data that are being generated or transmitted to the computer by the printer are correction data optimum for the printer at a particular period of time. Therefore, according to one or more illustrative aspects of the present invention, when optimum correction data are previously expected to be acquired, printing based on inappropriate correction data can be prevented.

Furthermore, it is possible to perform printing in accordance with correction data having finished undergoing correction processing. Therefore, printing can be performed in accordance with correction data optimum for the printer at that period of time.

Additionally, transmission of the output data can be more readily carried out.

Furthermore, correction data can be more readily generated. In particular, the computer issued a print request can immediately generate correction data.

Moreover, a print system capable of fulfilling a demand for immediate performance of printing can be provided; hence, a print system that offers greater convenience can be provided.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A print system comprising a printer and a computer,
the printer configured to generate an image on a sheet according to print data and the printer comprising:
a first processor; and
first memory storing computer-executable instructions that, when executed by the first processor, cause the printer to:
generate first correction data to be used by the computer to correct image data;
transmit the first correction data to the computer; and
in response to receiving, from the computer, a query requesting whether the printer is calibrating the first correction data to generate second correction data, transmit, to the computer, a response indicating that the printer is generating the second correction data while the printer is generating the second correction data;
after generating the second correction data, transmit the second correction data to the computer; and
the computer configured to receive an instruction and the computer comprising:
a second processor; and
second memory storing computer-executable instructions that, when executed by the second processor, cause the computer to:
in response to receiving the first correction data from the printer, store the first correction data in the second memory;
in response to receiving a first instruction to print, transmit the query requesting whether the printer is calibrating the first correction data to generate the second correction data;
in a first case in which the computer does not receive, from the printer, the response indicating that the printer is generating the second correction data:
generate first print data by correcting the image data using the first correction data stored in the second memory and transmit the first print data to the printer;
in a second case in which the computer receives, from the printer, the response indicating that the printer is generating the second correction data and the computer receives a second instruction to execute forced printing:
generate the first print data by correcting the image data using the first correction data stored in the second memory and transmit the first print data to the printer; and
in a third case in which the computer receives, from the printer, the response indicating that the printer is generating the second correction data and the computer does not receive the second instruction to execute forced printing:
maintain a wait state in which print data is not generated until the computer receives the second correction data from the printer;
in response to receiving the second correction data from the printer, store the second correction data received from the printer in the second memory; and
after storing the second correction data received from the printer in the second memory, generate second print data by correcting the image data using the second correction data stored in the second memory and transmit the second print data to the printer.

2. The print system according to claim 1, further comprising one or more additional computers configured to communicate with the printer, wherein the first correction data is transmitted to each of the one or more additional computers.

3. The print system according to claim 1, wherein the second memory stores computer-executable instructions that, when executed by the second processor, cause the computer to:
determine whether the second instruction to execute forced printing is received in response to a user input.

4. A non-transitory computer readable medium storing computer-executable instructions, that when executed by a computer, cause the computer to:
in response to receiving first correction data from a printer, store the first correction data in memory;
in response to receiving a first instruction to print, transmit a query requesting whether the printer is calibrating the first correction data to generate second correction data;

in a first case in which the computer does not receive, from the printer, a response indicating that the printer is generating the second correction data:
  generate first print data by correcting image data using the first correction data stored in the memory and transmit the first print data to the printer;
in a second case in which the computer receives, from the printer, the response indicating that the printer is generating the second correction data and the computer receives a second instruction to execute forced printing:
  generate the first print data by correcting the image data using the first correction data stored in the memory and transmit the first print data to the printer; and
in a third case in which the computer receives, from the printer, the response indicating that the printer is generating the second correction data and the computer does not receive the second instruction to execute forced printing:
  maintain a wait state in which print data is not generated until the computer receives the second correction data from the printer;
  in response to receiving the second correction data from the printer, store the second correction data received from the printer in the memory; and
  after storing the second correction data received from the printer in the memory, generate second print data by correcting the image data using the second correction data stored in the memory and transmit the second print data to the printer.

5. A printer coupled to a computer, the printer comprising:
a print apparatus configured to generate an image on a sheet in accordance with print data that is generated by correcting image data in accordance with correction data;
a processor;
memory storing computer-executable instructions that, when executed by the processor, cause the printer to:
  generate first correction data to be used by the computer to correct the image data;
  transmit the first correction data to the computer;
  receive, from the computer, a query requesting whether the printer is calibrating the first correction data to generate second correction data;
  retrieve information indicating whether the printer is generating the second correction data in response to receiving the query;
  transmit, to the computer, a first response to the computer when the retrieved information indicates that the printer is not generating the second correction data, the first response directing the computer to correct the image data in accordance with the first correction data;
  transmit, to the computer, a second response to the computer when the retrieved information indicates that the printer is generating the second correction data, the second response directing the computer to wait for the second correction data, without correcting the image data in accordance with the first correction data, unless an instruction to execute forced printing is received; and
  after generating the second correction data and after transmitting the second response, transmit the second correction data to the computer.

6. The print system according to claim 1,
wherein the printer is configured to terminate the generating of the second correction data while the generating of the second correction data is in progress in response to receiving the second instruction to execute forced printing.

7. The non-transitory computer readable medium according to claim 4, wherein the second instruction to execute forced printing causes the printer to terminate the generating of the second correction data while generation of the second correction data is in progress.

8. The print system according to claim 1, wherein the computer-executable instructions stored in the first memory further cause the printer to generate the first correction data in response to a calibration command received through the computer, the calibration command comprising an instruction to generate correction data.

9. The print system according to claim 1, wherein the computer-executable instructions stored in the first memory further cause the printer to generate the first correction data in response to a calibration command received through the printer, the calibration command comprising an instruction to generate correction data.

10. The non-transitory computer readable medium according to claim 4, wherein the computer-executable instructions further cause the computer to:
  receive a command to perform calibration; and
  transmit information, based on the command, to the printer to cause the printer to generate the first correction data.

11. The printer according to claim 5, wherein the computer-executable instructions further cause the printer to generate the first correction data in response to a calibration command received through the computer, the calibration command comprising an instruction to generate correction data.

12. The printer according to claim 5, wherein the computer-executable instructions further cause the printer to generate the first correction data in response to a calibration command received through the printer, the calibration command comprising an instruction to generate correction data.

13. The print system according to claim 1, wherein the first correction data represents past correction data and the second correction data represents an updated version of the past correction data.

14. The print system according to claim 3, wherein the second memory stores computer-executable instructions that, when executed by the second processor, cause the computer to:
  transmit an interrupt command to the printer to interrupt generation of the second correction data in response to determining that the second instruction to execute forced printing is received.

15. The printer according to claim 5, wherein the computer-executable instructions further cause the printer to transmit the second correction data if the instruction to execute forced printing is not received.

16. The print system according to claim 1, wherein the computer-executable instructions stored in the second memory further cause the computer to display a message indicating that the printer is generating the second correction data in response to receiving, from the printer, the response indicating that the printer is generating the second correction data.

17. The print system according to claim 16, wherein the message further comprises an option for a user to select to generate the second instruction to execute forced printing.

18. The print system according to claim 1, wherein the computer-executable instructions stored in the second memory further cause the computer to:

transmit, to the printer, information indicating a calibration number;

determine whether update flag data is received from the printer; and in response to determining that the update flag data is not received, display a message indicating that the first correction data stored in the second memory is not up to date.

19. The printer according to claim 5, wherein the computer-executable instructions further cause the printer to:

receive, from the computer, information indicating a calibration number;

compare the calibration number with a second calibration number stored in the memory of the printer;

determine whether the calibration number is equal to the second calibration number; and in response to determining that the calibration number is not equal to the second calibration number, transmit, to the computer, update flag data indicating that the correction data to be used by the computer to correct the image data is not up to date.

* * * * *